US012577501B2

(12) United States Patent
Mansergh et al.

(10) Patent No.: US 12,577,501 B2
(45) **Date of Patent: *Mar. 17, 2026**

(54) DETERGENT COMPOSITION AND METHODS OF PREVENTING ALUMINUM DISCOLORATION

(71) Applicant: ECOLAB USA INC., Saint Paul, MN (US)

(72) Inventors: John Mansergh, Saint Paul, MN (US); Lisa M. Sanders, Saint Paul, MN (US); Carter M. Silvernail, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 243 days.

This patent is subject to a terminal disclaimer.

(21) Appl. No.: 18/481,599

(22) Filed: Oct. 5, 2023

(65) Prior Publication Data

US 2024/0026249 A1 Jan. 25, 2024

Related U.S. Application Data

(63) Continuation of application No. 17/445,913, filed on Aug. 25, 2021, now Pat. No. 11,814,609, which is a
(Continued)

(51) Int. Cl.
*C11D 1/72* (2006.01)
*C11D 1/722* (2006.01)
(Continued)

(52) U.S. Cl.
CPC .................. *C11D 3/33* (2013.01); *C11D 1/72* (2013.01); *C11D 1/722* (2013.01); *C11D 3/0026* (2013.01);
(Continued)

(58) Field of Classification Search
CPC ............. C11D 1/72; C11D 1/722; C11D 3/08; C11D 3/10; C11D 3/33; C11D 3/3761;
(Continued)

(56) References Cited

U.S. PATENT DOCUMENTS 8,101,027 B2 1/2012 Vandermeulen et al.
8,138,138 B2 3/2012 Tjelta et al.
(Continued)

FOREIGN PATENT DOCUMENTS

JP 2011508821 A 3/2011
JP 2012528225 A 11/2012
(Continued)

OTHER PUBLICATIONS

"The International Search Report and Written Opinion of the International Searching Authority" in connection to PCT/US2018/025162 filed Mar. 29, 2018 mailed Jun. 6, 2018.

*Primary Examiner* — Gregory R Delcotto
(74) *Attorney, Agent, or Firm* — McKee, Voorhees & Sease, PLC

(57) ABSTRACT

Detergent compositions designed to prevent aluminum discoloration while providing high cleaning performance on soils and stains are disclosed. Detergent compositions substantially free of nitrilotriacetic acid (NTA) are disclosed. Methods of using the detergent compositions are also disclosed.

17 Claims, 9 Drawing Sheets
(9 of 9 Drawing Sheet(s) Filed in Color)

Control 1 – 1500 ppm  Control 1 – 2000 ppm

Related U.S. Application Data continuation of application No. 15/939,956, filed on Mar. 29, 2018, now Pat. No. 11,130,928.

(60) Provisional application No. 62/478,127, filed on Mar. 29, 2017.

(51) Int. Cl.

| | |
|---|---|
| ***C11D 3/00*** | (2006.01) |
| ***C11D 3/04*** | (2006.01) |
| ***C11D 3/08*** | (2006.01) |
| ***C11D 3/10*** | (2006.01) |
| ***C11D 3/30*** | (2006.01) |
| ***C11D 3/33*** | (2006.01) |
| ***C11D 3/37*** | (2006.01) |
| ***C11D 17/00*** | (2006.01) |
| ***C11D 17/06*** | (2006.01) |

(52) U.S. Cl.
CPC ................ *C11D 3/044* (2013.01); *C11D 3/08* (2013.01); *C11D 3/10* (2013.01); *C11D 3/3761* (2013.01); *C11D 17/0047* (2013.01); *C11D 17/0056* (2013.01); *C11D 17/0073* (2013.01); *C11D 17/06* (2013.01); *C11D 2111/16* (2024.01)

(58) Field of Classification Search
CPC ............ C11D 17/0047; C11D 17/0073; C11D 17/06; C11D 17/0056
USPC ....... 510/224, 227, 238, 245, 254, 475, 480, 510/488, 499; 134/25.2
See application file for complete search history.

(56) References Cited

U.S. PATENT DOCUMENTS

| | | | | |
|---|---|---|---|---|
| 8,198,228 | B2 | 6/2012 | Tjelta et al. | |
| 8,389,464 | B2 | 3/2013 | Tjelta et al. | |
| 8,530,403 | B2 | 9/2013 | Tjelta et al. | |
| 8,748,364 | B2 | 6/2014 | Silvernail | |
| 9,133,418 | B1 * | 9/2015 | Miralles | C11D 3/0073 |
| 9,267,096 | B2 | 2/2016 | Sanders et al. | |
| 9,546,345 | B2 | 1/2017 | Foster | |
| 11,130,928 | B2 | 9/2021 | Mansergh et al. | |
| 11,814,609 | B2 * | 11/2023 | Mansergh | C11D 17/06 |
| 2010/0300493 | A1 | 12/2010 | Snodgrass et al. | |
| 2012/0204908 | A1 | 8/2012 | Byrne et al. | |
| 2014/0121150 | A1 * | 5/2014 | Walters | C11D 3/3761 510/469 |
| 2014/0121310 | A1 * | 5/2014 | Balijepalli | C09D 7/65 524/265 |
| 2014/0171354 | A1 * | 6/2014 | Miralles | C11D 7/265 510/400 |
| 2014/0261564 | A1 * | 9/2014 | Miralles | C11D 3/3757 510/218 |
| 2015/0119312 | A1 | 4/2015 | Sanders et al. | |
| 2015/0218495 | A1 * | 8/2015 | Miralles | C11D 9/08 134/25.2 |
| 2015/0361385 | A1 * | 12/2015 | Pham | C11D 3/044 510/367 |

FOREIGN PATENT DOCUMENTS

| | | | | |
|---|---|---|---|---|
| JP | 2014162806 A | | 9/2014 | |
| JP | 2016536426 A | | 11/2016 | |
| JP | 2016538380 A | | 12/2016 | |
| WO | WO-2004065661 A2 | * | 8/2004 | C23G 1/125 |

* cited by examiner

Control 1 – 1500 ppm Control 1 – 2000 ppm

Control 2 – 1500 ppm Control 2 – 2000 ppm

EXP 1 – 1500 ppm EXP 1 – 2000 ppm

EXP2 - 1500ppm EXP2 – 2000 ppm

EXP3 - 1500ppm EXP3 – 2000 ppm

EXP4 - 1500ppm EXP4 – 2000 ppm

EXP5 - 1500ppm EXP5 – 2000 ppm

EXP6 - 1500ppm EXP6 – 2000 ppm

EXP7 - 1500ppm EXP7 – 2000 ppm

EXP8 - 1500ppm EXP8 – 2000 ppm

EXP9 - 1500ppm EXP9 – 2000 ppm

EXP10 - 1500ppm EXP10 – 2000 ppm

EXP11 - 1500ppm EXP11 – 2000 ppm

EXP12 - 1500ppm EXP12 – 2000 ppm

EXP13 - 1500ppm EXP13 – 2000 ppm

EXP14 - 1500ppm EXP14 – 2000 ppm

EXP15 - 1500ppm EXP15 – 2000 ppm

EXP16 - 1500ppm EXP16 – 2000 ppm

EXP17 - 1500ppm EXP17 – 2000 ppm

EXP18 - 1500ppm EXP18 – 2000 ppm

EXP19 - 1500ppm EXP19 – 2000 ppm

EXP20 - 1500ppm EXP20 – 2000 ppm

EXP21 - 1500ppm EXP21 – 2000 ppm

EXP22 - 1500ppm EXP22 – 2000 ppm

EXP23 - 1500ppm EXP23 – 2000 ppm

EXP24 - 1500ppm EXP24 – 2000 ppm

EXP25 - 1500ppm EXP25 – 2000 ppm

DETERGENT COMPOSITION AND METHODS OF PREVENTING ALUMINUM DISCOLORATION

CROSS-REFERENCE TO RELATED APPLICATIONS

This application is a Continuation Application of U.S. Ser. No. 17/445,913, filed Aug. 25, 2021, which is a Continuation Application of U.S. Ser. No. 15/939,956, filed Mar. 29, 2018, now U.S. Pat. No. 11,130,928, issued Sep. 28, 2021, which claims priority under 35 U.S.C. § 119 to provisional application U.S. Ser. No. 62/478,127 filed Mar. 29, 2017.

This application is also related to the U.S. Pat. No. 10,633,616 entitled "ALKALINE WAREWASH DETERGENT FOR ALUMINUM SURFACES." The entire contents of this patent application are hereby expressly incorporated herein by reference including, without limitation, the specification, claims, and abstract, as well as any figures, tables, or drawings thereof.

FIELD OF THE INVENTION

The invention relates to the detergent compositions designed to prevent aluminum discoloration while providing high cleaning performance on soils and stains. In particular, the detergent compositions disclosed herein are substantially free of nitrilotriacetic acid (NTA). The detergent compositions provide effective cleaning on hard surfaces, including the alkaline sensitive metal aluminum, or aluminum containing alloys, without causing discoloration on the surfaces.

BACKGROUND OF THE INVENTION

Conventional detergents used in warewashing include alkaline detergents. Alkaline detergents, particularly those intended for institutional use, can affect the appearance of metals, particularly soft metals such as aluminum. For example, alkaline detergents can create discoloration of aluminum pans which is detrimental to the aesthetic of the surface and presents concerns for a customer. Conventionally, alkaline detergents have contained phosphates and nitrilotriacetic acid (NTA) to reduce discoloration of soft metals including aluminum and provide other benefits. However, increased regulation of the use of these materials, as well as an ever-increasing trend towards safer and sustainable detergent compositions, has created a need to identify alternative compositions which provide high levels of cleaning efficacy without discoloring the metal substrates. This has led to the development of alternative complexing agents, builders, threshold agents, corrosion inhibitors, and the like, which are used instead of predominantly phosphorus containing compounds. For example, phosphates can bind calcium and magnesium ions, provide alkalinity, act as threshold agents, and protect alkaline sensitive metals such as aluminum and aluminum containing alloys.

Accordingly, it is an objective of the claimed detergent compositions to address at least one of the above problems and/or to offer improved or alternative detergent compositions with usage and/or environmental benefits.

A further object of the detergent compositions disclosed herein is to provide an improved warewashing and other hard surface cleaning composition for the removal of soils and stains without causing discoloration of aluminum surfaces.

A further object of the detergent compositions disclosed herein is to provide a method and process for employing the claimed detergent compositions.

Other objects, advantages and features of the detergent composition disclosed herein and/or use thereof will become apparent from the following specification taken in conjunction with the accompanying drawings.

BRIEF SUMMARY OF THE INVENTION

An advantage of the detergent composition disclosed herein is the improved warewashing and other hard surface cleaning provided by the claimed alkaline detergent compositions without causing discoloration of aluminum surfaces.

In one aspect, provided here are solid, alkaline, non-staining detergent compositions comprising: an alkalinity source; an alkali metal silicate; an aminocarboxylate comprising a mixture of ethylenediaminetetraacetic acid (EDTA) and methylglycine-N,N-diacetic acid (MGDA) or salts thereof; at least one water conditioning polymer; and optionally a defoaming agent; wherein the composition is substantially free of nitrilotriacetic acid (NTA). In some embodiments, the detergent compositions provide a ratio of the aminocarboxylates ethylenediaminetetraacetic acid (EDTA) or salt thereof to methylglycine-N,N-diacetic acid (MGDA) or salt thereof of at least about 1:1, provide a ratio of the alkali metal silicate to the aminocarboxylate, preferably the ethylenediaminetetraacetic acid (EDTA) or salt thereof, from about 1:1 to about 3:1, and provide a ratio of the alkali metal silicate to the water conditioning polymer(s), preferably the polymaleic acid homopolymer and polyacrylic acid homopolymer, from about 1:1 to about 5:1.

In some other embodiments, the detergent compositions disclosed herein provide solid, alkaline, non-staining detergent compositions comprising: from about 50 wt-% to about 75 wt-% of an alkali metal alkalinity source, from about 5 wt-% to about 20 wt-% of an alkali metal silicate, from about 5 wt-% to about 15 wt-% of an aminocarboxylate, from about 1 wt-% to about 20 wt-% of at least one water conditioning polymer, and from about 1 wt-% to about 5 wt-% of a defoaming agent.

In another aspect, provided here are methods of cleaning soils and stains with a detergent composition, comprising: contacting a soiled surface with the detergent compositions disclosed herein. In some embodiments, the methods disclosed herein further comprise removing soils from the surface without causing discoloration thereof.

While multiple embodiments are disclosed, still other embodiments of the detergent composition disclosed herein will become apparent to those skilled in the art from the following detailed description, which shows and describes illustrative embodiments of the detergent compositions disclosed herein. Accordingly, the drawings and detailed description are to be regarded as illustrative in nature and not restrictive.

BRIEF DESCRIPTION OF THE DRAWINGS

The patent or application file contains at least one drawing or photograph executed in color. Copies of this patent or patent application publication with color drawing(s) will be provided by the Office upon request and payment of the necessary fee.

Figure 1:
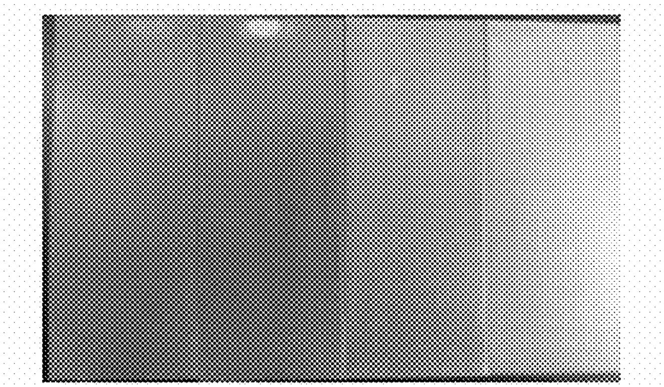
FIG. 1-FIG. 2 show photographs of aluminum coupons treated with commercial control formulations to assess staining and discoloring.

Various embodiments of the detergent composition disclosed herein will be described in detail with reference to the drawings, wherein like reference numerals represent like parts throughout the several views. Reference to various embodiments does not limit the scope of the detergent compositions disclosed herein. Figures represented herein are not limitations to the various embodiments according to the detergent compositions disclosed herein and are presented for exemplary illustration of the detergent compositions disclosed herein.

DETAILED DESCRIPTION OF THE PREFERRED EMBODIMENT

The embodiments of this invention are not limited to particular detergent compositions having non-coloring effects on aluminum metals/alloys, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects or embodiments of the compositions and methods disclosed herein are presented in a range format. It should be understood that the description in range format is merely for convenience and brevity and should not be construed as an inflexible limitation on the scope of the detergent compositions disclosed herein. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the detergent composition disclosed herein may be more readily understood, certain terms are first defined. Unless defined otherwise, all technical and scientific terms used herein have the same meaning as commonly understood by one of ordinary skill in the art to which embodiments of the detergent compositions disclosed herein pertain. Many methods and materials similar, modified, or equivalent to those described herein can be used in the practice of the embodiments of the detergent composition disclosed herein without undue experimentation, the preferred materials and methods are described herein. In describing and claiming the embodiments of the detergent composition disclosed herein, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

An "antiredeposition agent" refers to a compound that helps keep suspended in water instead of redepositing onto the object being cleaned. Antiredeposition agents are useful in the detergent composition disclosed herein to assist in reducing redepositing of the removed soil onto the surface being cleaned.

As used herein, the term "cleaning" refers to a method used to facilitate or aid in soil removal.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "soil" refers to polar or non-polar organic or inorganic substances including, but not limited to carbohydrates, proteins, fats, oils and the like. These substances may be present in their organic state or complexed to a metal to form an inorganic complex.

As used herein, the term "stain" refers to a polar or non-polar substance which may or may not contain particulate matter such as metal oxides, metal hydroxides, metal oxide-hydroxides, clays, sand, dust, natural matter, carbon black, graphite and the like As used herein, the term "substantially free of", "free of", "substantially free" or "free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%. According to embodiments of the detergent compositions disclosed herein, the claimed detergent compositions are substantially free of NTA.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both. According to embodiments of the detergent compositions disclosed herein, the claimed detergent compositions provide improved or substantially similar cleaning performance as conventional detergents containing phosphates and/or NTA.

The term "threshold agent" refers to a compound that inhibits crystallization of water hardness ions from solution, but that need not form a specific complex with the water hardness ion. Threshold agents include but are not limited to a polyacrylate, a polymethacrylate, an olefin/maleic copolymer, and the like.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. The term "ware" generally refers to items such as eating and cooking utensils, dishes, and other hard surfaces. Ware also refers to items made of various substrates, including glass, ceramic, china, crystal, metal, plastic or natural substances such, but not limited to clay, bamboo, hemp and the like. Types of plastics that can be cleaned with the detergent compositions disclosed herein include but are not limited to, those that include polypropylene (PP), high density polyethylene (HDPE), low density polyethylene (LDPE), polyvinyl chloride (PVC), syrene acrylonitrile (SAN), polycarbonate (PC), melamine formaldehyde resins or melamine resin (melamine), acrylonitrile-butadiene-styrene (ABS), and polysulfone (PS). Other exemplary plastics that can be cleaned using the detergent compositions disclosed herein include polyethylene terephthalate (PET) polystyrene polyamide.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The detergent composition disclosed herein may comprise, consist essentially of, or consist of the components and ingredients disclosed herein as well as other ingredients not described herein. As used herein, "consisting essentially of" means that the methods and compositions may include additional steps, components or ingredients, but only if the additional steps, components or ingredients do not materially alter the basic and novel characteristics of the claimed methods and detergent compositions.

Detergent Compositions

The detergent compositions disclosed herein provide alkali metal alkaline detergents for cleaning a variety of industrial and consumer surfaces. Beneficially, the detergent compositions do not cause discoloration of metal surfaces, including aluminum, while providing substantially-free NTA compositions. This is an unexpected advancement in the formulation of alkaline detergents, as formulations containing high concentrations of chelants, such as the aminocarboxylates employed in the detergent compositions disclosed according to the invention, are known to cause discoloration to the surfaces. Without being limited to a particular mechanism of theory of the detergent compositions disclosed herein, the detergent compositions employing preferred ratios of the aminocarboxylates, along with preferred ratios of alkali metal silicates to the aminocarboxylates, and preferred ratios of the alkali metal silicates to water conditioning polymer(s), unexpectedly provide the high levels of cleaning performance without discoloration of the metal surface, namely aluminum surfaces.

The claimed detergent compositions comprise, consist of and/or consist essentially of an alkali metal carbonate and/or hydroxide alkalinity source, an alkali metal silicate, a combination of aminocarboxylates, and at least one water conditioning polymer. In further embodiments, the claimed detergent compositions comprise, consist of and/or consist essentially of an alkali metal carbonate and/or hydroxide alkalinity source, an alkali metal silicate, an aminocarboxylate comprising a mixture of ethylenediaminetetraacetic acid (EDTA) and methylglycine-N,N-diacetic acid (MGDA) or salts thereof, a polymaleic acid homopolymer and/or a polyacrylic acid homopolymer, and a defoaming agent. In still further embodiments, the claimed detergent compositions comprise, consist of and/or consist essentially of an alkali metal carbonate and/or hydroxide alkalinity source, an alkali metal silicate, an aminocarboxylate comprising a mixture of ethylenediaminetetraacetic acid (EDTA) and methylglycine-N,N-diacetic acid (MGDA) or salts thereof, a polymaleic acid homopolymer, a polyacrylic acid homopolymer, a defoaming agent, and optionally at least one additional functional ingredients. In yet further embodiments, the claimed detergent compositions comprise, consist of and/or consist essentially of an alkali metal carbonate alkalinity source, an alkali metal silicate, an aminocarboxylate comprising a mixture of ethylenediaminetetraacetic acid (EDTA) and methylglycine-N,N-diacetic acid (MGDA) or salts thereof, a polymaleic acid homopolymer, a polyacrylic acid homopolymer, and a defoaming agent.

In some embodiments, a use solution of the detergent compositions disclosed herein does not cause any discoloration of a metal surface cleaned by the detergent compositions. In some other embodiments, a use solution having a concentration of greater than 1,500 ppm of the detergent compositions disclosed herein does not cause any discoloration of a metal surface cleaned by the detergent compositions. In yet some other embodiments, a use solution having a concentration of greater than 2,000 ppm of the detergent compositions disclosed herein does not cause any discoloration of a metal surface cleaned by the detergent compositions. In some other embodiments, a use solution of the detergent compositions disclosed herein yield a metallic finishing of a metal surface cleaned by the claimed detergent compositions.

Exemplary ranges of the detergent compositions according to the invention are shown in Table 1 in weight percentage of the solid detergent compositions.

TABLE 1

| Material | First Exemplary Range wt-% | Second Exemplary Range wt-% | Third Exemplary Range wt-% | Fourth Exemplary Range wt-% |
|---|---|---|---|---|
| Alkali metal alkalinity source | 20-80 | 30-75 | 40-75 | 50-75 |
| Alkali metal silicate | 0.1-25 | 0.1-20 | 1-20 | 5-20 |
| Aminocarboxylates | 1-25 | 1-20 | 5-15 | 10-15 |
| Water Conditioning Polymer(s) | 0.1-25 | 1-20 | 1-15 | 1-10 |
| Defoaming agent | 0.1-25 | 1-20 | 1-10 | 1-5 |
| Additional Functional Ingredients | 0-25 | 0-20 | 0-10 | 0-5 |

In some embodiments the ratio of the alkali metal silicate to the aminocarboxylate, preferably the ethylenediaminetetraacetic acid (EDTA) or salt thereof, is from about 1:1 to about 3:1, from about 1:2 to about 3:1, from about 1:1 to about 2:1, from about 1:2 to about 4:1, or preferably from about 1:1 to about 1.6:1. In addition, without being limited according to the detergent compositions disclosed herein, all ranges for the ratios recited are inclusive of the numbers defining the range and include each integer within the defined range of ratios.

In some embodiments the ratio of the alkali metal silicate to the water conditioning polymer(s), preferably the polymaleic acid homopolymer and polyacrylic acid homopolymer, is from about 1:1 to about 5:1, from about 2:1 to about 5:1, or preferably from about 2:1 to about 3.5:1. In addition, without being limited according to the detergent compositions disclosed herein, all ranges for the ratios recited are inclusive of the numbers defining the range and include each integer within the defined range of ratios.

In some embodiments the ratio of the aminocarboxylates in the solid composition, preferably the ethylenediaminetetraacetic acid (EDTA) or salt thereof to the methylglycine-N,N-diacetic acid (MGDA) or salt thereof, is from about 1:1 to about 10:1, from about 1:3 to about 10:1, from about 1:3 to about 5:1, from about 1:3 to about 3:1, from about 1:2 to about 2:1, from about 1:2 to about 5:1, from about 1:1 to about 5:1, or preferably from about 1:1 to about 3:1. In addition, without being limited according to the detergent compositions disclosed herein, all ranges for the ratios recited are inclusive of the numbers defining the range and include each integer within the defined range of ratios.

The solid detergent compositions may include solid concentrate compositions. A "solid" composition refers to a composition in the form of a solid such as a powder, a particle, agglomerate, a flake, a granule, a pellet, a tablet, a lozenge, a puck, a briquette, a brick, a solid block, a unit dose, or another solid form known to those of skill in the art. The term "solid" refers to the state of the detergent composition under the expected conditions of storage and use of the solid detergent composition. In general, it is expected that the detergent composition will remain in solid form when exposed to elevated temperatures of 100° F., 112° F., and preferably 120° F. A cast, pressed, or extruded "solid" may take any form including a block. When referring to a cast, pressed, or extruded solid it is meant that the hardened composition will not flow perceptibly and will substantially retain its shape under moderate stress, pressure, or mere gravity. For example, the shape of a mold when removed from the mold, the shape of an article as formed upon extrusion from an extruder, and the like. The degree of hardness of the solid cast composition can range from that of a fused solid block, which is relatively dense and hard similar to concrete, to a consistency characterized as being malleable and sponge-like, similar to caulking material.

The alkaline detergent compositions can be made available as concentrates that are diluted (or as multiple concentrates that are diluted and combined) prior to or at the point of use to provide a use solution for application a variety of surfaces, namely hard surfaces. In a particular embodiment, the alkaline detergent compositions are suitable for application to alkaline sensitive metals. An advantage of providing concentrates that are later combined is that shipping and storage costs can be reduced because it can be less expensive to ship and store a concentrate rather than a use solution and is also more sustainable because less packaging is used.

Alkalinity Source

In an embodiment the detergent compositions include an alkalinity source. In an embodiment, the alkalinity source is selected from an alkali metal hydroxide and alkali metal carbonate. Suitable alkali metal hydroxides and carbonates include, but are not limited to sodium carbonate, potassium carbonate, sodium hydroxide and potassium hydroxide. In some embodiments of the detergent compositions disclosed herein, the alkali metal carbonates and alkali metal hydroxides are further understood to include bicarbonates and sesquicarbonates. According to the detergent compositions disclosed herein, any "ash-based" or "alkali metal carbonate" shall also be understood to include all alkali metal carbonates, bicarbonates and/or sesquicarbonates.

In a preferred embodiment, the alkalinity source is an alkali metal carbonate. In some other preferred embodiments, the alkalinity source is an alkali metal carbonate, free of any unreacted alkali metal hydroxide. In further preferred embodiments, the alkaline cleaning compositions do not include organic alkalinity sources.

The alkalinity source is provided in an amount sufficient to provide a use solution of the detergent compositions disclosed herein with a pH of at least about 8, at least about 9, at least about 10, at least about 11, or at least about 12. The use solution pH range is preferably between about 8.0 and about 13.0, and more preferably between about 10 to 12.5.

In an embodiment, the detergent compositions include from about 20 wt-% to about 80 wt-% of the alkalinity source, from about 30 wt-% to about 75 wt-% of the alkalinity source, from about 40 wt-% to about 75 wt-% of the alkalinity source, from about 60 wt-% to about 75 wt-% of the alkalinity source, and preferably from about 50 wt-% to about 75 wt-% of the alkalinity source. In addition, without being limited according to the detergent compositions disclosed herein, all ranges recited are inclusive of the numbers defining the range and include each integer within the defined range.

Silicate Source

In an embodiment the detergent compositions include a silicate source. In a preferred embodiment, the silicate source is an alkali metal silicate. The silicate can include an alkaline metal silicate or hydrate thereof. In another embodiment, silicate can be or comprise a metasilicate. An example of a particularly suitable silicate source includes, but is not limited to, sodium silicate. Exemplary alkali metal silicates are provided in Tables 2-4 below.

TABLE 3

| Name | ($M_2O$:$SiO_2$) (wt) | % $M_2O$ | % $SiO_2$ | Baume at 20° C. | Specific Gravity | Viscosity (Poise/ 20° C.) |
|---|---|---|---|---|---|---|
| Sodium | 1:160 | 19.70 | 31.5 | 58.3 | 1.68 | 70.00 |
| Silicate | 1:2.00 | 18.00 | 36.0 | 59.3 | 1.69 | 700.00 |
| (solutions) | 1:2.50 | 10.60 | 26.5 | 42.0 | 1.41 | 0.60 |
| | 1:2.88 | 11.00 | 31.7 | 47.0 | 1.49 | 9.60 |
| | 1:3.22 | 8.90 | 28.7 | 41.0 | 1.39 | 1.80 |
| | 1:3.75 | 6.80 | 25.3 | 35.0 | 1.32 | 2.20 |
| Potassium | 1:2.50 | 8.30 | 20.8 | 29.8 | 1.26 | 0.40 |
| Silicate | 1:2.20 | 9.05 | 19.9 | 30.0 | 1.26 | 0.07 |
| (solutions) | 1:2.10 | 12.50 | 26.3 | 40.0 | 1.38 | 10.50 |
| | 1:1.80 | 10.40 | 29.5 | 47.7 | 1.49 | 13.00 |
| Lithium | 1:9.4 | 2.20 | 20.7 | — | — | — |
| Silicate | 1:9.6 | 2.10 | 20.0 | — | — | 4.00 |
| (solutions) | 1:11.8 | 1.60 | 18.8 | — | — | — |
| | 1:17.0 | 1.20 | 20.0 | — | — | 2.50 |

TABLE 4

| Name | Formula | Melting Point (° C.) | Density (g/ml) | ΔH cal/wt at 25° | RI alpha | RI beta | RI gamma |
|---|---|---|---|---|---|---|---|
| Sodium Orthosilicate | $Na_4SiO_4$ ($2Na_2O$•$SiO_2$) | 1118 | 2.50 | −497,800 | 1.524 | — | 1.537 |
| Sodium Sesquisilicate | $Na_6Si_2O_7$ ($3Na_2O$•$2SiO_2$) | 1122 | 2.96 | −856,300 | 1.524 | — | 1.529 |
| Sodium Sesquisilicate Pentahydrate | $Na_6Si_2O_75H_2O$ ($3Na_2O$•$2SiO_25H_2O$) | 88 | — | −1,648,000 | 1.502 | 1.510 | 1.524 |
| Sodium Metasilicate | $Na_2SiO_3$ ($Na_2O$•SiO2) | 1089 | 2.614 | −364,700 | 1.490 | 1.500 | 1.510 |
| Sodium Metasilicate Pentahydrate | $Na_2SiO_35H_2O$ ($Na_2O$•$Si_2O_25H_2O$) | 72.2 | 1.749 | −722,100 | 1.447 | 1.454 | 1.467 |
| Sodium Metasilicate hexahydrate | $Na_2SiO_36H_2O$ ($Na_2O$•$SiO_36H_2O$) | 70<br>62.9 | 1.807 | −792,600 | 1488<br>1.465 | —<br>1.475 | 1.495<br>1.465 |
| Sodium Metasilicate Octahydrate | $Na_2SiO_38H_2O$ ($Na_2O$•$SiO_38H_2O$) | 48.35 | 1.672 | −934,800 | 1.475 | 1.463 | 1.465 |
| Sodium Metasilicate Nanohydrate | $Na_2SiO_39H_2O$ ($Na_2O$•$SiO_29H_2O$) | 47.85 | 1.646 | −1,005,100 | 1.451 | 1.456 | 1.460 |
| Sodiuin | $Na_2Si_2O_5$ | 874 | 2.964 | −576,100 | 1.500 | 1.510 | 1.518 |

TABLE 2

| Commercial Solid Silicates | | | | | | |
|---|---|---|---|---|---|---|
| Name | $M_2O$:$SiO_2$ (wt) | % $M_2O$ | % $SiO_2$ | % $H_2O$ | Softening Pt (° C.) | Flow Pt (° C.) |
| Sodium | 1:3.22 | 23.5 | 75.7 | — | 655 | 840 |
| Silicate (anhydrous glasses) | 1:2.00 | 33.0 | 66.0 | — | 590 | 760 |
| Potassium Silicate (anhydrous glasses) | 1:2.50 | 28.3 | 70.7 | — | 700 | 905 |
| Sodium | 1:3.22 | 19.2 | 61.8 | 18.5 | — | — |
| Silicates (hydrated amphorous powders) | 1:2.00 | 27.0 | 54.0 | 18.5 | — | — |

In an embodiment, the detergent compositions disclosed herein include from about wt-% to about 25 wt-% of the silicate source, from about 0.1 wt-% to about 20 wt-% of the silicate source, from about 1 wt-% to about 20 wt-% of the silicate source, from about wt-% to about 20 wt-% of the silicate source, and preferably from about 5 wt-% to about 20 wt-% of the silicate source. In addition, without being limited according to the detergent compositions disclosed herein, all ranges recited are inclusive of the numbers defining the range and include each integer within the defined range.

Aminocarboxylates

In an embodiment, the detergent compositions include a combination of aminocarboxylates (or aminocarboxylic acid materials). In a preferred embodiment, the aminocarboxylates include aminocarboxylic acid materials containing little or free of NTA. Exemplary aminocarboxylates include, for example, N-hydroxyethylaminodiacetic acid, ethylenediaminetetraacetic acid (EDTA), methylglycinediacetic acid (MGDA), hydroxyethylenediaminetetraacetic acid, diethylenetriaminepentaacetic acid, N-hydroxyethyl-ethylenediaminetriacetic acid (HEDTA), glutamic acid N,N-diacetic acid (GLDA), diethylenetriaminepentaacetic acid (DTPA), and other similar acids having an amino group with a carboxylic acid substituent.

In an embodiment, the claimed detergent compositions include a combination of ethylenediaminetetraacetic acid (EDTA) and methylglycinediacetic acid (MGDA). In some embodiments the ratio of the aminocarboxylates in the solid composition, preferably the ethylenediaminetetraacetic acid (EDTA) or salt thereof to the methylglycine-N,N-diacetic acid (MGDA) or salt thereof, is from about 1:2 to about 2:1, from about 1:1 to about 2:1, from about 1:1 to about 10:1, from about 1:1 to about 5:1, from about 1:2 to about 4:1, from about 1:3 to about 4:1, from about 1:3.5 to about 4:1, from about 1:3 to about 3:1, or preferably from about 1:1 to about 3:1. In addition, without being limited according to the detergent compositions disclosed herein, all ranges for the ratios recited are inclusive of the numbers defining the range and include each integer within the defined range of ratios.

Beneficially, the claimed detergent compositions provide a strong cleaning performance while employing chelants that are substantially free of NTA-containing compounds, making the claimed detergent compositions more environmentally acceptable.

In an embodiment, the claimed detergent compositions include from about 1 wt-% to about 25 wt-% of the aminocarboxylates, from about 1 wt-% to about 20 wt-% of the aminocarboxylates, from about 1 wt-% to about 15 wt-% of the aminocarboxylates, and preferably from about 5 wt-% to about 15 wt-% of the aminocarboxylates. In another embodiment, the compositions include from about 1 wt-% to about 15 wt-% of EDTA, from about 1 wt-% to about 10 wt-% of EDTA, from about 5 wt-% to about 15 wt-% of EDTA, and preferably from about 5 wt-% to about 10 wt-% of EDTA, in addition to MGDA. In yet another embodiment, the compositions include from about 1 wt-% to about wt-% of MGDA, from about 1 wt-% to about 10 wt-% of MGDA, from about 5 wt-% to about 15 wt-% of MDGA, and preferably from about 5 wt-% to about 10 wt-% of MDGA, in addition to EDTA. In addition, without being limited according to the detergent compositions disclosed herein, all ranges recited are inclusive of the numbers defining the range and include each integer within the defined range.

Water Conditioning Polymers

In an embodiment the claimed detergent compositions include at least one water conditioning polymer and preferably two water conditioning polymers. In a preferred embodiment, the detergent composition comprises a polymaleic acid homopolymer and polyacrylic acid homopolymer. In a preferred embodiment, the detergent composition comprises a polymaleic acid homopolymer, polyacrylic acid homopolymer, and optionally one or more additional polymers. Suitable polymaleic acid homopolymers include those with a molecular weight less than about 2,000 g/mol. Suitable polyacrylic acid homopolymers include those with a molecular weight between about 500-50,000 g/mol more preferable between about 1,000-25,000 g/mol and most preferably between about 1,000-15,000 g/mol.

Additional water conditioning polymers can also be referred to as non-phosphorus containing builders. Additional water conditioning polymers may include, but are not limited to: polycarboxylates. Exemplary polycarboxylates that can be used as builders and/or water conditioning polymers include, but are not limited to: those having pendant carboxylate (—CO2-) groups such as polyacrylic acid homopolymers, polymaleic acid homopolymers, maleic/olefin copolymers, sulfonated copolymers or terpolymers, acrylic/maleic copolymers or terpolymers polymethacrylic acid homopolymers, polymethacrylic acid copolymers or terpolymers, acrylic acid-methacrylic acid copolymers, hydrolyzed polyacrylamides, hydrolyzed polymethacrylamides, hydrolyzed polyamide-methacrylamide copolymers, hydrolyzed polyacrylonitriles, hydrolyzed polymethacrylonitriles, hydrolyzed acrylonitrile-methacrylonitrile copolymers and combinations thereof. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at sub stoichiometric levels to function as crystal modifiers.

In an embodiment, the claimed detergent compositions include from about 0.1 wt-% to about 25 wt-% of the water conditioning polymer(s), from about 1 wt-% to about 20 wt-% of the water conditioning polymer(s), from about 1 wt-% to about 15 wt-% of the water conditioning polymer(s), and preferably from about 1 wt-% to about 10 wt-% of the water conditioning polymer(s). In addition, without being limited according to the detergent compositions disclosed herein, all ranges recited are inclusive of the numbers defining the range and include each integer within the defined range.

Defoaming Agents

In an embodiment, the detergent compositions may optionally include a defoaming agent. In another embodiment, the detergent compositions include a defoaming agent. In a preferred embodiment, the defoaming agent is a nonionic surfactant. In a preferred embodiment, the defoaming agent is a nonionic alkoxylated surfactant. In another preferred embodiment, the defoaming agent is a nonionic surfactant having a formula RO—$(PO)_{0-5}$ $(EO)_{1-30}$ $(PO)_{1-30}$, or RO—$(PO)_{1-30}$ $(EO)_{1-30}$ $(PO)_{1-30}$, wherein R is a $C_{8-18}$ linear or branched alkyl group; EO=ethylene oxide; PO=propylene oxide. Exemplary suitable alkoxylated surfactants include ethylene oxide/propylene block copolymers (EO/PO copolymers), such as those available under the name Pluronic or Plurafac®, capped EO/PO copolymers, partially capped EO/PO copolymers, fully capped EO/PO copolymers, alcohol alkoxylates, capped alcohol alkoxylates, mixtures thereof, or the like.

Other defoaming agents can include silicone compounds such as silica dispersed in polydimethylsiloxane, polydimethylsiloxane, and functionalized polydimethylsiloxane such as those available under the name Abil B9952, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein for all purposes.

Nonionic surfactants generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent.

The length of the hydrophilic polyoxyalkylene moiety which is condensed with any particular hydrophobic compound can be readily adjusted to yield a water dispersible or water soluble compound having the desired degree of balance between hydrophilic and hydrophobic properties. According to the detergent compositions disclosed herein, the nonionic surfactant useful in the composition is a low-foaming nonionic surfactant. Examples of nonionic low foaming surfactants useful in the detergent composition disclosed herein include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronico manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from 1,000 to 4,000. Ethylene oxide is then added to sandwich this hydrophobe between hydrophilic groups, controlled by length to constitute from about 10% by weight to about 80% by weight of the final molecule. Tetronic® compounds are tetra-functional block copolymers derived from the sequential addition of propylene oxide and ethylene oxide to ethylenediamine. The molecular weight of the propylene oxide hydrotype ranges from 500 to 7,000; and, the hydrophile, ethylene oxide, is added to constitute from 10% by weight to 80% by weight of the molecule.

2. Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Dow.

3. Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.

4. Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

5. Compounds with the following structure: RO—$(PO)_{0-5}$ $(EO)_{1-30}(PO)_{1-30}$, wherein R is a C8-18 linear or branched alkyl group; EO=ethylene oxide; PO=propylene oxide.

6. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from 1,000 to 3,100 with the central hydrophile including 10% by weight to 80% by weight of the final molecule. These reverse Pluronics® are manufactured by BASF Corporation under the trade name Pluronic® R surfactants.

7. Alkoxylated diamines produced by the sequential addition of propylene oxide and ethylene oxide to ethylenediamine. The hydrophobic portion of the molecule weighs from 250 to 6,700 with the central hydrophile including 0.1% by weight to 50% by weight of the final molecule. Examples of commercial compounds of this chemistry are available from BASF Corporation under the tradename Tetronic™ Surfactants.

8. Alkoxylated diamines produced by the sequential addition of ethylene oxide and propylene oxide to ethylenediamine. The hydrophobic portion of the molecule weighs from 250 to 6,700 with the central hydrophile including 0.1% by weight to 50% by weight of the final molecule. Examples of commercial compounds of this chemistry are available from BASF Corporation under the tradename Tetronic R™ Surfactants.

9. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

10. Polyoxyalkylene surface-active agents which are advantageously used in the compositions of this invention correspond to the formula: $P[(C_3H_6O)_n(C_2H_4O)_m H]_x$ wherein P is the residue of an organic compound having from 8 to 18 carbon atoms and containing x reactive hydrogen atoms in which x has a value of 1 or 2, n has a value such that the molecular weight of the polyoxyethylene portion is at least 44 and m has a value such that the oxypropylene content of the molecule is from 10% to 90% by weight. In either case the oxypropylene chains may contain optionally, but advantageously, small amounts of ethylene oxide and the oxyethylene chains may contain also optionally, but advantageously, small amounts of propylene oxide.

11. Alkoxylated amines or, most particularly, alcohol alkoxylated/aminated/alkoxylated surfactants. These nonionic surfactants may be at least in part represented by the general formulae:

$R^{20}$—$(PO)_sN$-$(EO)_tH$, $R^{20}$—$(PO)_sN$-$(EO)_tH(EO)_tH$, and $R^{20}$—$N(EO)_tH$;

in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to preferably 2-5, t is 1-10, preferably 2-5, and u is 1-10, preferably 2-5. Other variations on the scope of these compounds may be represented by the alternative formula:

$$R^{20}—(PO)_v—N[(EO)_wH][(EO)_zH]$$

in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic PEA 25 Amine Alkoxylate.

In an embodiment, the claimed detergent compositions include from about 0.5 wt-% to about 15 wt-% of the defoaming agent, from about 0.5 wt-% to about 10 wt-% of the defoaming agent, from about 0.5 wt-% to about 5 wt-% of the defoaming agent, and preferably from about 0.5 wt-% to about 3 wt-%, about 1 wt-%, about 3 wt-%, about 5 wt-%, or about 10 wt-% of the defoaming agent. In addition, without being limited according to the detergent compositions disclosed herein, all ranges recited are inclusive of the numbers defining the range and include each integer within the defined range.

Additional Functional Ingredients

The components of the claimed detergent compositions can further be combined with various functional components suitable for use in ware wash and other applications employing an alkaline detergent or cleaning composition. In some embodiments, the detergent compositions including the aminocarboxylates, silicates, alkalinity source, water conditioning polymer(s) and optionally the defoaming agent make up a large amount, or even substantially all of the total weight of the detergent composition. For example, in some embodiments few or no additional functional ingredients are disposed therein.

In other embodiments, one or more additional functional ingredients may be included in the claimed detergent compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash applications. However, other embodiments may include functional ingredients for use in other applications.

In preferred embodiments, the claimed detergent compositions do not include the chelant NTA. In other embodiments, the claimed detergent compositions may include additional alkalinity sources such as alkali metal borates, phosphates and percarbonates. The compositions may also include additional defoaming agents, anti-redeposition agents, bleaching agents, solubility modifiers, dispersants, rinse aids, metal protecting agents, enzymes, stabilizing agents, corrosion inhibitors, metal catalysts, additional sequestrants and/or chelating agents, fragrances and/or dyes, rheology modifiers or thickeners, hydrotropes or couplers, buffers, solvents and the like.

Phosphonates

In some embodiments, the detergent composition disclosed herein include a phosphonate. Examples of phosphonates include, but are not limited to: phosphinosuccinic acid oligomer (PSO) described in U.S. Pat. Nos. 8,871,699 and 9,255,242; 2-phosphinobutane-1,2,4-tricarboxylic acid (PBTC)-hydroxyethane-1,1-diphosphonic acid, $CH_2C(OH)[PO(OH)_2]_2$; aminotri(methylenephosphonic acid), $N[CH_2PO(OH)_2]_3$; aminotri(methylenephosphonate), sodium salt (ATMP), $N[CH_2PO(ONa)_2]_3$; 2-hydroxyethyliminobis(methylenephosphonic acid), $HOCH_2CH_2N[CH_2PO(OH)_2]_2$; diethylenetriaminepentatmethylenephosphonic acid), $(HO)_2POCH_2N[CH_2CH_2N[CH_2PO(OH)_2]_2]_2$; diethylenetriaminepenta(methylenephosphonate), sodium salt (DTPMP), $C_9H_{(28-x)}N_3Na_xO_{15}P_5$ (x=7); hexamethyienediamine(tetramethylenephosphonate), potassium salt, $C_{10}H_{(28-x)}N_2K_xO_{12}P_4$ (x=6); bis(hexamethylene)triamine(pentamethylenphosphonic acid), $(HO_2)POCH_2N[(CH_2)_2N[CH_2PO(OH)_2]_2]_2$; monoethanolamine phosphonate (MEAP); diglycolamine phosphonate (DGAP) and phosphorus acid, $H_3PO_3$. Preferred phosphonates are PBTC, HEDP, ATMP and DTPMP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the claimed detergent composition is phosphorous-free.

Suitable amounts of the phosphonates included in the detergent composition disclosed herein are between about 0% and about 25% by weight of the composition, between about 0.1% and about 20%, between about 0% and about 15%, between about 0% and about 10%, between about 0% and about 5%, between about 0.5% and about 10%, between about 0.5% and about 5%, or between about 0.5% and about 15% by weight of the composition.

Surfactants

In some embodiments, the detergent composition disclosed herein include a surfactant. In some other embodiments, the detergent compositions disclosed herein include a nonionic defoaming surfactant. In some other embodiments, the detergent compositions disclosed herein include an additional surfactant together with a nonionic defoaming surfactant. Surfactants suitable for use with the detergent composition disclosed herein include, but are not limited to, additional nonionic surfactants, anionic surfactants, cationic surfactants and zwitterionic surfactants. In yet some other embodiments, the detergent compositions disclosed herein is free of any additional surfactant other than a nonionic defoaming surfactant or nonionic defoaming surfactants.

In some embodiments, the detergent compositions disclosed herein include, in addition to the nonionic defoaming surfactant or agent, about 0 wt-% to about 50 wt-% of a surfactant, from about 0 wt-% to about 25 wt-%, from about 0 wt-% to about 15 wt-%, from about 0 wt-% to about 10 wt-%, from about 0 wt-% to about 5 wt-%, about 0 wt-%, about 0.5 wt-%, about 1 wt-%, about 3 wt-%, about 5 wt-%, about 10 wt-%, or about 15 wt-% of an additional surfactant.

Anionic Surfactants

Also useful in the detergent composition disclosed herein are surface active substances which are categorized as anionic surfactants because the charge on the hydrophobic group is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionic surfactants are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

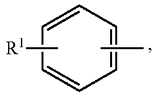
, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

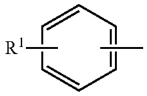

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Cationic Surfactants

Cationic Quaternary Surfactant/Quaternary Alkyl Amine Alkoxylate

The cationic quaternary surfactants are substances based on nitrogen centered cationic moieties with net positive change. Suitable cationic surfactants contain quaternary ammonium groups. Suitable cationic surfactants especially include those of the general formula: $N^{(+)}R^1R^2R^3R^4X^{(-)}$, wherein $R^1$, $R^2$, $R^3$ and $R^4$ independently of each other represent alkyl groups, aliphatic groups, aromatic groups, alkoxy groups, polyoxyalkylene groups, alkylamido groups, hydroxyalkyl groups, aryl groups, $H^+$ ions, each with from 1 to 22 carbon atoms, with the provision that at least one of the groups $R^1$, $R^2$, $R^3$ and $R^4$ has at least eight carbon atoms and wherein X(−) represents an anion, for example, a halogen, acetate, phosphate, nitrate or alkyl sulfate, preferably a chloride. The aliphatic groups can also contain cross-linking or other groups, for example additional amino groups, in addition to the carbon and hydrogen atoms.

Particular cationic active ingredients include, for example, but are not limited to, alkyl dimethyl benzyl ammonium chloride (ADBAC), alkyl dimethyl ethylbenzyl ammonium chloride, dialkyl dimethyl ammonium chloride, benzethonium chloride, N,N-bis-(3-aminopropyl) dodecylamine, chlorhexidine gluconate, an organic and/or organic salt of chlorhexidene gluconate, PHMB (polyhexamethylene biguanide), salt of a biguanide, a substituted biguanide derivative, an organic salt of a quaternary ammonium containing compound or an inorganic salt of a quaternary ammonium containing compound or mixtures thereof.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

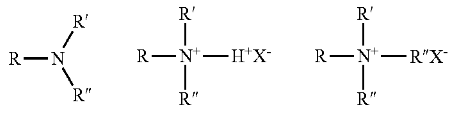

in which, R represents a long alkyl chain, R', R", and R"' may be either long alkyl chains or smaller alkyl or aryl groups or hydrogen and X represents an anion. The amine salts and quaternary ammonium compounds are preferred for practical use in this invention due to their high degree of water solubility.

Preferred cationic quaternary ammonium compound can be schematically shown as:

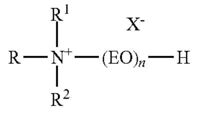

in which R represents a C8-C18 alkyl or alkenyl; $R^1$ and $R^2$ are C1-C4 alkyl groups; n is 10-25; and x is an anion selected from a halide or methyl sulfate.

The majority of large volume commercial cationic surfactants can be subdivided into four major classes and additional sub-groups known to those of skill in the art and described in "Surfactant Encyclopedia," Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the detergent composition disclosed herein include those having the formula $R^1{}_mR^2{}_xYLZ$ wherein each $R^1$ is an organic group containing a straight or branched alkyl or alkenyl group optionally substituted with up to three phenyl or hydroxy groups and optionally interrupted by up to four of the following structures:

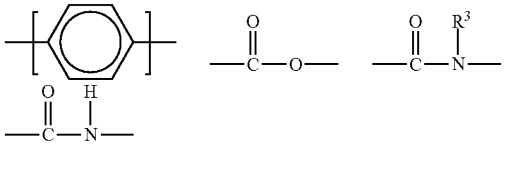

or an isomer or mixture of these structures, and which contains from 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2, or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group is filled by hydrogens.

Y can be a group including, but not limited to:

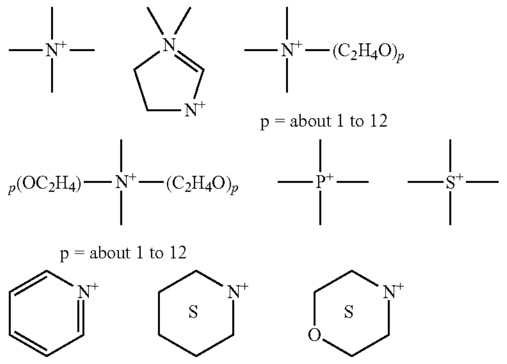

or a mixture thereof.

Preferably, L is 1 or 2, with the Y groups being separated by a moiety selected from $R^1$ and $R^2$ analogs (preferably alkylene or alkenylene) having from 1 to 22 carbon atoms and two free carbon single bonds when L is 2. Z is a water soluble anion, such as sulfate, methylsulfate, hydroxide, or nitrate anion, particularly preferred being sulfate or methyl sulfate anions, in a number to give electrical neutrality of the cationic component.

Suitable concentrations of the cationic quaternary surfactant in the cleaning composition may include between about 0% and about 10% by weight of the cleaning composition.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the detergent composition disclosed herein generally have the general formula:

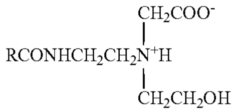

(MONO)ACETATE

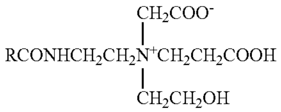

(DI)PROPIONATE

Neutral pH Zwitterion

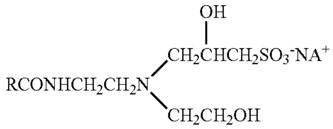

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which R=$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong"inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

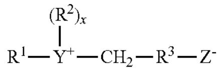

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P, P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

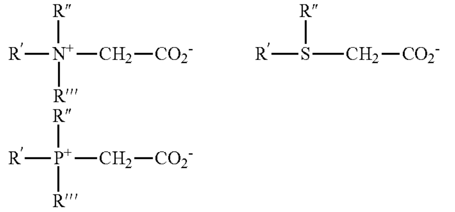

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the detergent composition disclosed herein include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Enzymes

The solid alkaline compositions according to the invention can further include an enzyme to provide enhanced removal of soils, prevention of redeposition and additionally the reduction of foam in use solutions of the cleaning compositions. The purpose of the enzyme is to break down adherent soils, such as starch or proteinaceous materials, typically found in soiled surfaces and removed by a detergent composition into a wash water source. The enzyme compositions remove soils from substrates and prevent redeposition of soils on substrate surfaces. Enzymes provide additional cleaning and detergency benefits, such as antifoaming.

Exemplary types of enzymes which can be incorporated into detergent compositions or detergent use solutions include amylase, protease, lipase, cellulase, cutinase, gluconase, peroxidase and/or mixtures thereof. An enzyme composition according to the invention may employ more than one enzyme, from any suitable origin, such as vegetable, animal, bacterial, fungal or yeast origin. However, according to a preferred embodiment of the detergent compositions disclosed herein, the enzyme is a protease. As used herein, the terms "protease" or "proteinase" refer enzymes that catalyze the hydrolysis of peptide bonds.

As one skilled in the art shall ascertain, enzymes are designed to work with specific types of soils. For example, according to an embodiment of the detergent compositions disclosed herein, ware wash applications may use a protease enzyme as it is effective at the high temperatures of the ware wash machines and is effective in reducing protein-based soils. Protease enzymes are particularly advantageous for cleaning soils containing protein, such as blood, cutaneous scales, mucus, grass, food (e.g., egg, milk, spinach, meat residue, tomato sauce), or the like. Protease enzymes are capable of cleaving macromolecular protein links of amino acid residues and convert substrates into small fragments that are readily dissolved or dispersed into the aqueous use solution. Proteases are often referred to as detersive enzymes due to the ability to break soils through the chemical reaction known as hydrolysis. Protease enzymes can be obtained, for example, from *Bacillus subtilis, Bacillus licheniformis* and *Streptomyces griseus*. Protease enzymes are also commercially available as serine endoproteases. Examples of commercially-available protease enzymes are available under the following trade names: Esperase, Purafect, Purafect L, Purafect Ox, Everlase, Liquanase, Savinase, Prime L, Prosperase and Blap.

According to the detergent compositions disclosed herein, the enzyme may be varied based on the particular cleaning application and the types of soils in need of cleaning. For example, the temperature of a particular cleaning application will impact the enzymes selected for an enzyme composition according to the detergent compositions disclosed herein. Ware wash applications, for example, clean substrates at temperatures in excess of approximately 60° C., or in excess of approximately 70° C., or between approximately 65°-80° C., and enzymes such as proteases are desirable due to their ability to retain enzymatic activity at such elevated temperatures.

The enzymes according to the detergent compositions disclosed herein may be an independent entity and/or may be formulated in combination with a detergent composition. In addition, enzyme compositions may be formulated into various delayed or controlled release formulations. For example, a solid molded detergent composition may be prepared without the addition of heat. As a skilled artisan will appreciate, enzymes tend to become denatured by the application of heat and therefore use of enzymes within detergent compositions require methods of forming a detergent composition that does not rely upon heat as a step in the formation process, such as solidification.

The enzyme may further be obtained commercially in a solid (i.e., puck, powder, etc.) or liquid formulation. Commercially-available enzymes are generally combined with stabilizers, buffers, cofactors and inert vehicles. The actual active enzyme content depends upon the method of manufacture, which is well known to a skilled artisan and such methods of manufacture are not critical to the detergent composition disclosed herein.

Alternatively, an enzyme(s) may be provided separate from the detergent composition, such as added directly to the wash liquor or wash water of a particular application of use, e.g. dishwasher.

Additional description of enzyme compositions suitable for use in the detergent compositions disclosed herein is disclosed for example in U.S. Pat. Nos. 7,670,549, 7,723, 281, 7,670,549, 7,553,806, 7,491,362, 6,638,902, 6,624,132, and 6,197,739 and U.S. Patent Publication Nos. 2012/0046211 and 2004/0072714, each of which are herein incorporated by reference in its entirety. In addition, the reference "Industrial Enzymes", Scott, D., in Kirk-Othmer Encyclopedia of Chemical Technology, 3rd Edition, (editors Grayson, M. and EcKroth, D.) Vol. 9, pp. 173-224, John Wiley & Sons, New York, 1980 is incorporated herein in its entirety.

In a preferred embodiment, the enzyme compositions are provided in the solid detergent compositions disclosed herein in an amount between about 0.01 wt-% to about wt-%, between about 0.01 wt-% to about 30 wt-%, between about 0.01 wt-% to about wt-%, between about 0.1 wt-% to about 5 wt-%, and preferably between about 0.5 wt-% to about 1 wt-%.

Methods of Use

The detergent compositions disclosed herein provide alkali metal carbonate and/or alkali metal hydroxide alkaline detergents for cleaning a variety of industrial and consumer surfaces, including those alkaline sensitive metals. In an embodiment, the alkaline sensitive metal is aluminum. Exemplary metals that can be used with the alkaline detergent compositions include Aluminum 1050, 1060, 1100, 1199, 2014, 2219, 3003, 3004, 3102, 4041, 5005, 5052, 5083, 5086, 5154, 5356, 5454, 5456, 5754, 6005, 6005A, 6060, 6061, 6063, 6066, 6070, 6082, 6105, 6162, 6262, 6351, 6463, 7005, 7022, 7068, 7072, 7075, 7079, 7116, 7129, and 7178, all of which are aluminum-based alloys. As used herein, the phrase "alkaline sensitive metal" identifies those metals that exhibit corrosion and/or discoloration when exposed to an alkaline detergent in solution. An alkaline solution is an aqueous solution having a pH that is greater than 7, or preferably greater than 8. Exemplary alkaline sensitive metals include soft metals such as aluminum, nickel, tin, zinc, copper, brass, bronze, and mixtures thereof. Aluminum and aluminum alloys are common alkaline sensitive metals that can be cleaned by the alkaline detergent compositions of the invention.

Articles which require such cleaning according to the detergent compositions disclosed herein includes any article with a surface that contains an alkaline sensitive metal, such as, aluminum or aluminum containing alloys. Such articles can include metal wares, and metals in dishwashing machine. In addition, the detergent compositions disclosed herein can be used in environments other than inside a dishwashing machine. Alkaline sensitive metals in need of cleaning are found in several locations.

Articles can also be found in various industrial applications, food and beverage applications, healthcare, textile care and laundry, paper processing, any other consumer markets where carbonate-based alkaline detergents (or alternatively hydroxide-based alkaline detergents) are employed. Suitable articles may include: industrial plants, maintenance and repair services, manufacturing facilities, kitchens, and restaurants. Exemplary equipment having a surface containing an alkaline sensitive metal include sinks, cookware, utensils, machine parts, vehicles, tanker trucks, vehicle wheels, work surfaces, tanks, immersion vessels, spray washers, and ultrasonic baths. Exemplary locations also include trucks, vehicle wheels, ware, and facilities. One exemplary application of the alkaline sensitive metal cleaning detergent composition for cleaning alkaline sensitive metals can be found in cleaning vehicle wheels in a vehicle washing facility. Compositions including the novel anti-discoloration components may be used in any of these applications and the like.

The solid detergent compositions may include solid concentrate compositions. The solid compositions are diluted to form use compositions. In general, a concentrate refers to a composition that is intended to be diluted with water to provide a use solution that contacts an object to provide the desired cleaning, rinsing, or the like. The detergent composition that contacts the articles to be washed can be referred to as a concentrate or a use composition (or use solution) dependent upon the formulation employed in methods according to the invention. It should be understood that the concentration of the active components, including the aminocarboxylates, water conditioning polymer(s), alkalinity source, silicates and other optional functional ingredients in the detergent composition will vary depending on whether the detergent composition is provided as a concentrate or as a use solution.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

In an embodiment, the claimed detergent compositions are preferably used at use concentrations of at least about 500 ppm, preferably at least 1000 ppm, and still more preferably at 2000 ppm or greater. In some embodiments, the alkaline detergent compositions are preferably used at use concentrations from about 500 ppm to 4000 ppm, from about 1000 ppm to 4000 ppm, from about 1500 ppm to 4000 ppm, or from about 2000 ppm to 4000 ppm.

In an embodiment, the alkaline detergent composition provides a use solution for contacting a surface in need of cleaning at pH greater than 7, or preferably greater than 8, or preferably greater than 9, or preferably greater than 10.

Once contacted for a sufficient period of time, the soils and/or stains on the article or surface in need of non-staining or non-discoloration cleaning are loosened and/or removed from the article or surface. In some embodiments the wares or articles may need to be "soaked" for a period of time for the alkaline composition to penetrate the soils and/or stains. In some embodiments, the contacting step such as submerging the ware or other article in need of soil and/or stain removal further includes the use of warm water to form the pre-soak solution in contact with the stains for at least a few seconds, preferably at least about 45 seconds to 24 hours, preferably at least about 45 seconds to 6 hours, and more preferably for at least about 45 seconds to 1 hour. In some embodiments, wherein the pre-soak is applied within a warewash machine, the soaking period of time may be from about 2 seconds to 20 minutes in an institutional machine, and optionally longer in a consumer machine. In a preferred embodiment, the pre-soak is applied (e.g. ware is soaked in the alkaline fatty acid soap solution) for a period of at least 60 seconds, preferably at least 90 seconds. Beneficially, the soaking of ware or other soiled or stained articles according to the invention does not require agitation; however, use of agitation may be employed for further removal of soils.

As one skilled in the art will ascertain from the disclosure of the invention, the method can include more steps or fewer steps than laid out here.

Methods of Manufacture

The alkaline detergent compositions of the present invention can be formed by combining the components in the weight percentages and ratios disclosed herein. The alkaline compositions are provided as a solid and a use solution is formed during the warewashing processes (or other application of use).

Solid alkaline detergent compositions formed using the solidification matrix are produced using a batch or continuous mixing system. In an exemplary embodiment, a single- or twin-screw extruder is used to combine and mix one or more agents at high shear to form a homogeneous mixture. In some embodiments, the processing temperature is at or below the melting temperature of the components. The processed mixture may be dispensed from the mixer by forming, casting or other suitable means, whereupon the detergent composition hardens to a solid form. The structure of the matrix may be characterized according to its hardness, melting point, material distribution, crystal structure, and other like properties according to known methods in the art. Generally, a solid detergent composition processed according to the method of the invention is substantially homogeneous with regard to the distribution of ingredients throughout its mass and is dimensionally stable.

Specifically, in a forming process, the liquid and solid components are introduced into the final mixing system and are continuously mixed until the components form a substantially homogeneous semi-solid mixture in which the components are distributed throughout its mass. In an exemplary embodiment, the components are mixed in the mixing system for at least approximately 5 seconds. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

Pressing can employ low pressures compared to conventional pressures used to form tablets or other conventional solid compositions. For example, in an embodiment, the present method employs a pressure on the solid of only less than or equal to about 5000 psi. In certain embodiments, the present method employs pressures of less than or equal to about 3500 psi, less than or equal to about 2500 psi, less than or equal to about 2000 psi, or less than or equal to about 1000 psi. In certain embodiments, the present method can employ pressures of about 1 to about 1000 psi, about 2 to about 900 psi, about 5 psi to about 800 psi, or about 10 psi to about 700 psi.

Specifically, in a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

By the term "solid form", it is meant that the hardened composition will not flow and will substantially retain its shape under moderate stress or pressure or mere gravity. The degree of hardness of the solid cast composition may range from that of a fused solid product which is relatively dense and hard, for example, like concrete, to a consistency characterized as being a hardened paste. In addition, the term "solid" refers to the state of the detergent composition under the expected conditions of storage and use of the solid detergent composition. In general, it is expected that the detergent composition will remain in solid form when exposed to temperatures of up to approximately 100° F. and particularly greater than approximately 120° F.

The resulting solid detergent composition may take forms including, but not limited to: a pressed solid; a cast solid product; an extruded, molded or formed solid pellet, block, tablet, powder, granule, flake; or the formed solid can thereafter be ground or formed into a powder, granule, or flake. In an exemplary embodiment, extruded pellet materials formed by the solidification matrix have a weight of between approximately 50 grams and approximately 250 grams, extruded solids formed by the solidification matrix have a weight of approximately 100 grams or greater, and solid block detergents formed by the solidification matrix have a mass of between approximately 1 and approximately 10 kilograms. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use. Alternatively, the solid alkaline detergent composition is provided in the form of a unit dose, typically provided as a cast solid, an extruded pellet, or a tablet having a size of between approximately 1 gram and approximately 100 grams. In another alternative, multiple-use solids can be provided, such as a block or a plurality of pellets, and can be repeatedly used to generate aqueous detergent compositions for multiple cycles.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the detergent composition disclosed herein are further defined in the following non-limiting Examples. It should be understood that these Examples, while indicating certain embodiments of the detergent compositions disclosed herein, are given by way of illustration only. From the above discussion and these Examples, one skilled in the art can ascertain the essential characteristics of this invention, and without departing from the spirit and scope thereof, can make various changes and modifications of the embodiments of the detergent compositions disclosed herein to adapt it to various usages and conditions. Thus, various modifications of the embodiments of the detergent compositions disclosed herein, in addition to those shown and described herein, will be apparent to those skilled in the art from the foregoing description. Such modifications are also intended to fall within the scope of the appended claims.

Example 1

Various control formulations and Experimental formulations 1-27 were evaluated for staining and discoloring of aluminum coupons according to the procedure outlined herein. Aluminum metal coupons, approximately 3"×1"×1/16", were obtained and number stamped. The coupons were washed with mild liquid detergent and rinsed well with DI water and Acetone before drying at ambient temperature for 30 minutes. The coupons were placed into bottles with the test solutions (1500 ppm and 2000 ppm of each formulation evaluated). A full immersion test was conducted to maximize the amount of surface area exposed to the solution for a soaking period of 8 hours at 160° F. At the end of the test, coupons are rinsed with DI water and allowed to dry. The coupons were visually analyzed and graded on a pass/fail basis.

The evaluated formulations included: Control formulation 1 (sodium carbonate, sodium silicate, nitrilotriacetic acid (NTA) based detergent); control formulation 2 (sodium carbonate, sodium silicate, methylglycine-N,N-diacetic acid (MGDA) based detergent); and Experimental formulations 1-27 as shown in Tables 5A-5F. Various actives employed include the following when referencing to generic or commercial names:

Dense Ash-Sodium carbonate;

Plurafac® SLF-180; defoaming agent or nonionic surfactant;

Trilon M Granules-methylglycine-N,N-diacetic acid sodium salt, 78% active;

EDTA-ethylenediaminetetraacetic acid, 99% active;

Belclene 200-polymaleic acid available from BWA Water Additives, 50% active;

Acusol 445-polyacrylic acid available from DOW Chemical, 45% active.

TABLE 5A

| | EXP1 | EXP2 | EXP3 | EXP4 |
|---|---|---|---|---|
| Dense Ash | 67.00 | 61.00 | 63.00 | 61.00 |
| Sodium Silicate 2.4, 83% | 15.00 | 16.00 | 15.00 | 16.00 |
| Trilon M Granules SG, 78% | 5.50 | 6.50 | 6.00 | 11.00 |
| EDTA, 99% | 5.50 | 6.50 | 6.00 | 2.00 |
| Plurafac SLF-180 | 1.00 | 1.00 | 1.00 | 1.00 |
| Belclene 200 Poly Maleic Acid, 50% | 3.00 | 4.50 | 4.50 | 4.50 |
| Acusol 445, 45% | 3.00 | 4.50 | 4.50 | 4.50 |
| $SiO_2$ (Sodium Silicate) | 12.45 | 13.28 | 12.45 | 13.28 |
| Chelant | 9.74 | 11.51 | 10.62 | 10.56 |
| EDTA | 5.45 | 6.44 | 5.94 | 1.98 |
| MGDA | 4.29 | 5.07 | 4.68 | 8.58 |
| Polymer | 2.85 | 4.28 | 4.28 | 4.28 |
| $SiO_2$ (Sodium Silicate)/EDTA | 2.28 | 2.06 | 2.10 | 6.71 |
| $SiO_2$ (Sodium Silicate)/Polymer | 4.37 | 3.10 | 2.91 | 3.10 |

TABLE 5B

| | EXP5 | EXP6 | EXP7 | EXP8 | EXP9 |
|---|---|---|---|---|---|
| Dense Ash | 64.00 | 64.00 | 64.00 | 64.00 | 64.00 |
| Sodium Silicate 2.4, 83% | 15.00 | 15.00 | 14.00 | 14.00 | 14.00 |
| Trilon M Granules SG, 78% | 6.00 | 7.00 | 6.00 | 7.00 | 9.00 |
| EDTA, 99% | 5.00 | 4.00 | 6.00 | 5.00 | 3.00 |

TABLE 5B-continued

| | EXP5 | EXP6 | EXP7 | EXP8 | EXP9 |
|---|---|---|---|---|---|
| Plurafac SLF-180 | 1.00 | 1.00 | 1.00 | 1.00 | 1.00 |
| Belclene 200 Poly Maleic Acid, 50% | 4.50 | 4.50 | 4.50 | 4.50 | 4.50 |
| Acusol 445, 45% | 4.50 | 4.50 | 4.50 | 4.50 | 4.50 |
| $SiO_2$ (Sodium Silicate) | 12.45 | 12.45 | 11.62 | 11.62 | 11.62 |
| Chelant | 9.63 | 9.42 | 10.62 | 10.41 | 9.99 |
| EDTA | 4.95 | 3.96 | 5.94 | 4.95 | 2.97 |
| MGDA | 4.68 | 5.46 | 4.68 | 5.46 | 7.02 |
| Polymer | 4.28 | 4.28 | 4.28 | 4.28 | 4.28 |
| $SiO_2$ (Sodium Silicate)/EDTA | 2.52 | 3.14 | 1.96 | 2.35 | 3.91 |
| $SiO_2$ (Sodium Silicate)/Polymer | 2.91 | 2.91 | 2.71 | 2.71 | 2.71 |

TABLE 5C

| | EXP10 | EXP11 | EXP12 | EXP13 |
|---|---|---|---|---|
| Dense Ash | 65.00 | 65.00 | 65.00 | 65.00 |
| Sodium Silicate 2.4, 83% | 14.00 | 14.00 | 14.00 | 14.00 |
| Trilon M Granules SG, 78% | 6.00 | 7.00 | 8.00 | 9.00 |
| EDTA, 99% | 5.00 | 4.00 | 3.00 | 2.00 |
| Plurafac SLF-180 | 1.00 | 1.00 | 1.00 | 1.00 |
| Belclene 200 Poly Maleic Acid, 50% | 4.50 | 4.50 | 4.50 | 4.50 |
| Acusol 445, 45% | 4.50 | 4.50 | 4.50 | 4.50 |
| $SiO_2$ (Sodium Silicate) | 11.62 | 11.62 | 11.62 | 11.62 |
| Chelant | 9.63 | 9.42 | 9.21 | 9.00 |
| EDTA | 4.95 | 3.96 | 2.97 | 1.98 |
| MGDA | 4.68 | 5.46 | 6.24 | 7.02 |
| Polymer | 4.28 | 4.28 | 4.28 | 4.28 |
| $SiO_2$ (Sodium Silicate)/EDTA | 2.35 | 2.93 | 3.91 | 5.87 |
| $SiO_2$ (Sodium Silicate)/Polymer | 2.71 | 2.71 | 2.71 | 2.71 |

TABLE 5D

| | EXP14 | EXP15 | EXP16 | EXP17 | EXP18 |
|---|---|---|---|---|---|
| Dense Ash | 61.00 | 61.00 | 66.00 | 66.00 | 67.00 |
| Sodium Silicate 2.4, 83% | 16.00 | 16.00 | 15.00 | 15.00 | 15.00 |
| Trilon M Granules SG, 78% | 11.00 | 11.00 | 8.00 | 10.00 | 6.00 |
| EDTA, 99% | 2.00 | 2.00 | 4.00 | 2.00 | 6.00 |
| Plurafac SLF-180 | 1.00 | 1.00 | 1.00 | 1.00 | 1.00 |
| Belclene 200 Poly Maleic Acid, 50% | 4.50 | 4.50 | 3.00 | 3.00 | 2.50 |
| Acusol 445, 45% | 4.50 | 4.50 | 3.00 | 3.00 | 2.50 |
| SiO2 (Sodium Silicate) | 13.28 | 13.28 | 12.45 | 12.45 | 12.45 |
| Chelant | 10.56 | 10.56 | 10.20 | 9.78 | 10.62 |
| EDTA | 1.98 | 1.98 | 3.96 | 1.98 | 5.94 |
| MGDA | 8.58 | 8.58 | 6.24 | 7.80 | 4.68 |
| Polymer | 4.28 | 4.28 | 2.85 | 2.85 | 2.38 |
| SiO2 (Sodium Silicate)/ EDTA | 6.71 | 6.71 | 3.14 | 6.29 | 2.10 |
| SiO2 (Sodium Silicate)/ Polymer | 3.10 | 3.10 | 4.37 | 4.37 | 5.23 |

TABLE 5E

| | EXP19 | EXP20 | EXP21 | EXP22 | EXP23 |
|---|---|---|---|---|---|
| Dense Ash | 67.00 | 67.00 | 66.00 | 66.00 | 66.00 |
| Sodium Silicate 2.4, 83% | 15.00 | 15.00 | 15.00 | 15.00 | 15.00 |
| Trilon M Granules SG, 78% | 8.00 | 10.00 | 6.00 | 8.00 | 10.00 |
| EDTA, 99% | 4.00 | 2.00 | 6.00 | 4.00 | 2.00 |
| Plurafac SLF180 | 1.00 | 1.00 | 2.00 | 2.00 | 2.00 |
| Belclene 200 Poly Maleic Acid, 50% | 2.50 | 2.50 | 2.50 | 2.50 | 2.50 |
| Acusol 445, 45% | 2.50 | 2.50 | 2.50 | 2.50 | 2.50 |
| $SiO_2$ (Sodium Silicate) | 12.45 | 12.45 | 12.45 | 12.45 | 12.45 |
| Chelant | 10.20 | 9.78 | 10.62 | 10.20 | 9.78 |
| EDTA | 3.96 | 1.98 | 5.94 | 3.96 | 1.98 |
| MGDA | 6.24 | 7.80 | 4.68 | 6.24 | 7.80 |

TABLE 5E-continued

| | EXP19 | EXP20 | EXP21 | EXP22 | EXP23 |
|---|---|---|---|---|---|
| Polymer | 2.38 | 2.38 | 2.38 | 2.38 | 2.38 |
| $SiO_2$ (Sodium Silicate)/EDTA | 3.14 | 6.29 | 2.10 | 3.14 | 6.29 |
| $SiO_2$ (Sodium Silicate)/Polymer | 5.23 | 5.23 | 5.23 | 5.23 | 5.23 |

TABLE 5F

| | EXP24 | EXP25 |
|---|---|---|
| Dense Ash | 68.00 | 67.00 |
| Sodium Silicate 2.4, 83% | 15.00 | 15.00 |
| Trilon M Granules SG, 78% | 5.00 | 5.00 |
| EDTA, 99% | 5.00 | 5.00 |
| Plurafac SLF180 | 1.00 | 2.00 |
| Belclene 200 Poly Maleic Acid, 50% | 3.00 | 3.00 |
| Acusol 445, 45% | 3.00 | 3.00 |
| $SiO_2$ (Sodium Silicate) | 12.45 | 12.45 |
| Chelant | 8.85 | 8.85 |
| EDTA | 4.95 | 4.95 |
| MGDA | 3.90 | 3.90 |
| Polymer | 2.85 | 2.85 |
| $SiO_2$ (Sodium Silicate)/EDTA | 2.52 | 2.52 |
| $SiO_2$ (Sodium Silicate)/Polymer | 4.37 | 4.37 |

The results of the Pass/Fail evaluation for the various evaluated formulations are shown in Table 6. A failure indicated aluminum discoloration occurred, where a pass indicated no aluminum discoloration. The photographs showing the visual assessment after the soaking test described herein are shown in FIG. 1-FIG. 27.

Figure 2:
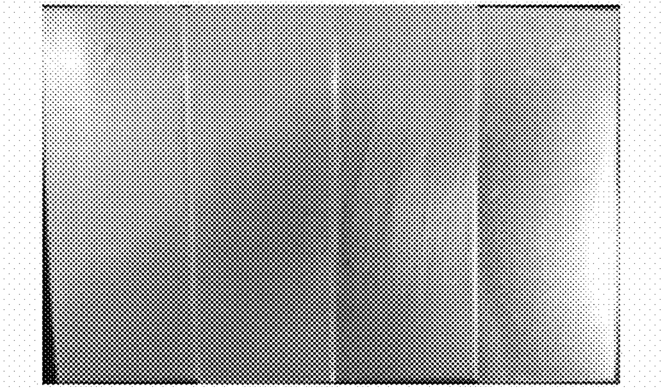
Figure 3:
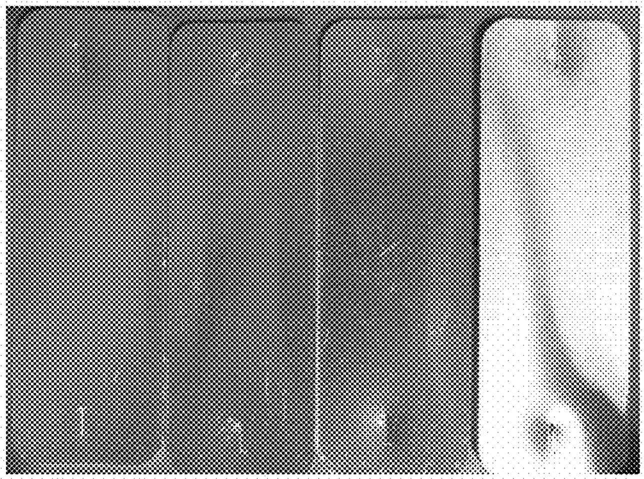
FIG. 3-FIG. 27 show photographs of aluminum coupons treated with experimental formulations EXP1-EXP25 at varying concentrations (1500 ppm for the left two coupons; 2000 ppm for the right two coupons) to assess staining and discoloring according to embodiments of the detergent compositions disclosed herein.
Figure 4:
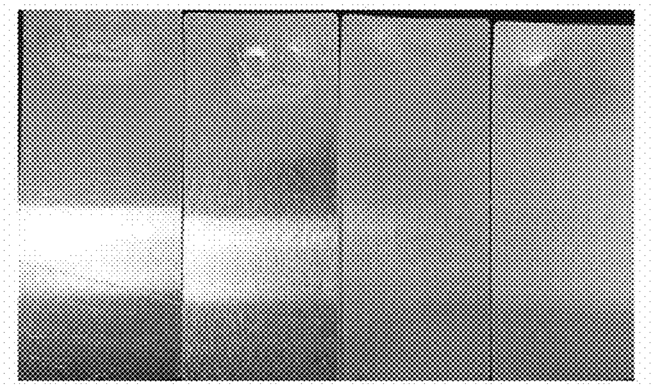
Figure 5:
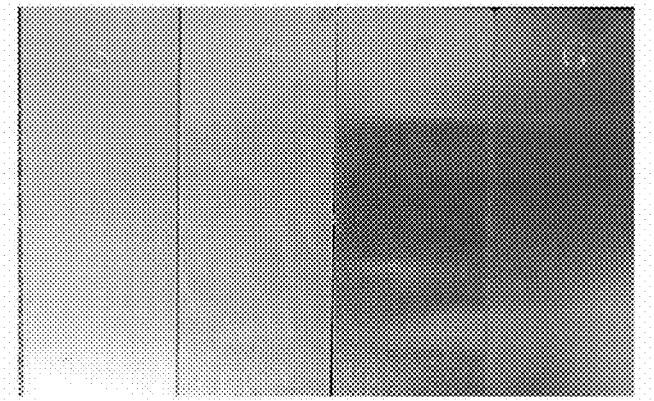
Figure 6:
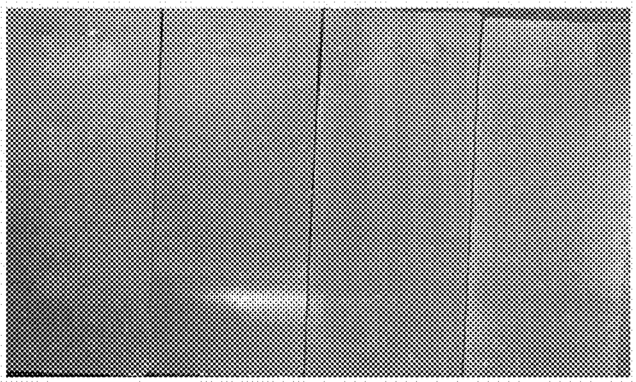
Figure 7:
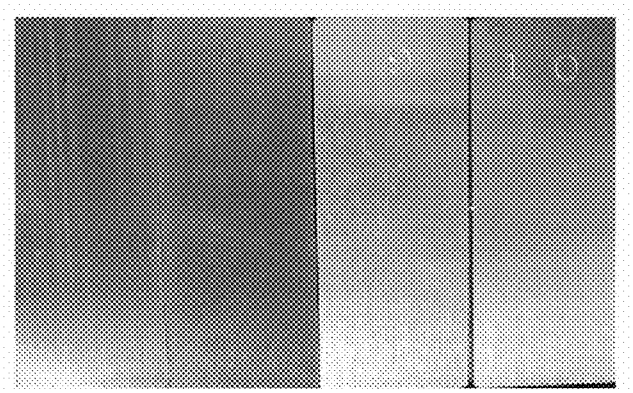
Figure 8:
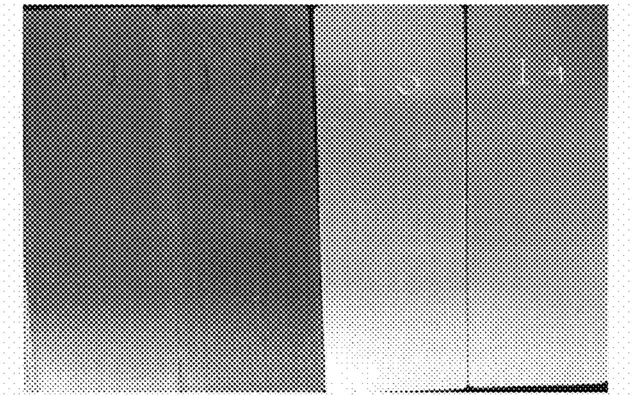
Figure 9:
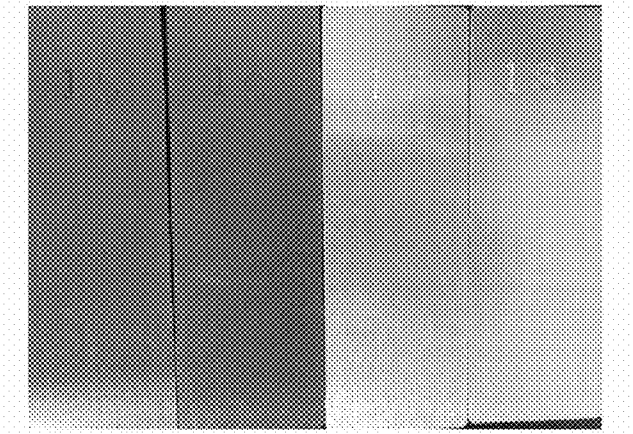
Figure 10:
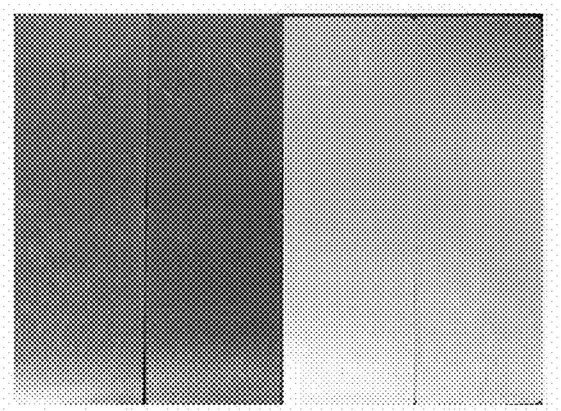
Figure 11:
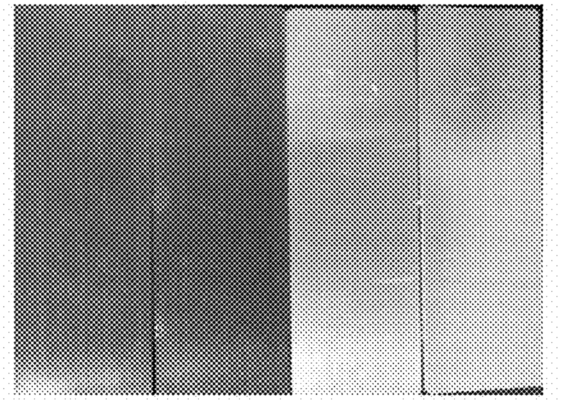
Figure 12:
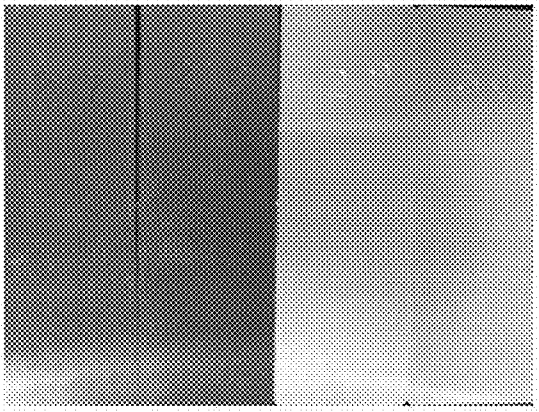
Figure 13:
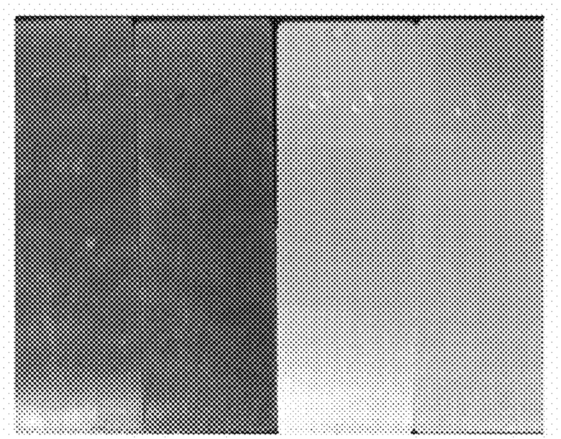
Figure 14:
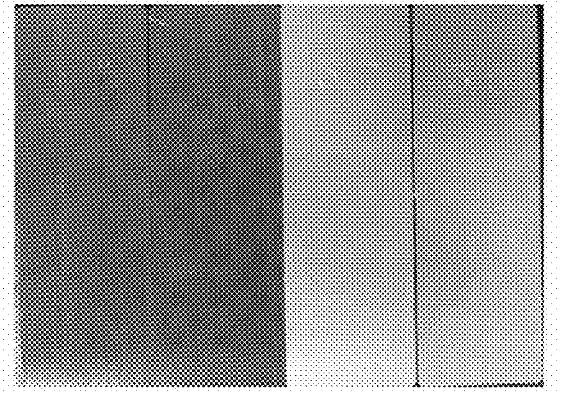
Figure 15:
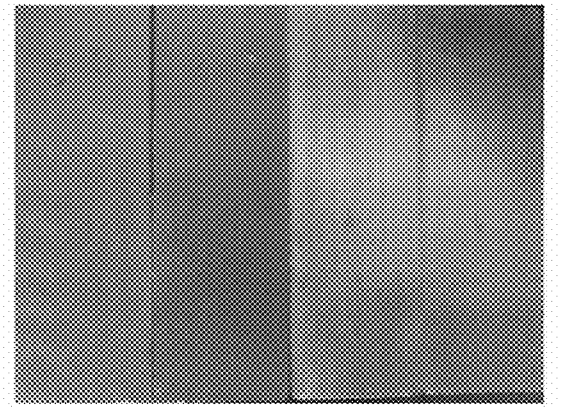
Figure 16:
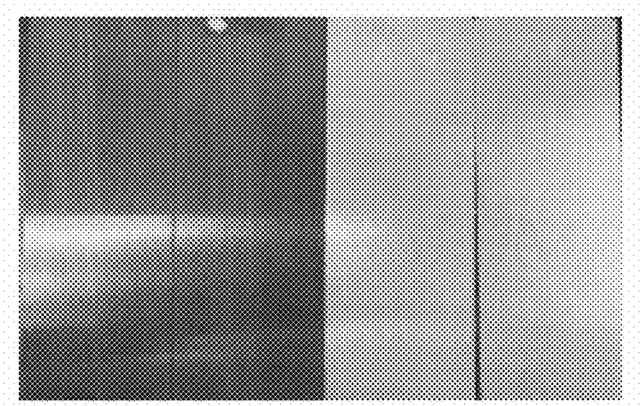
Figure 17:
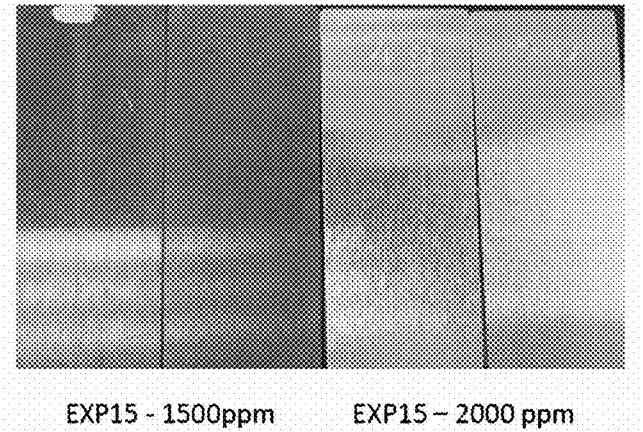
Figure 18:
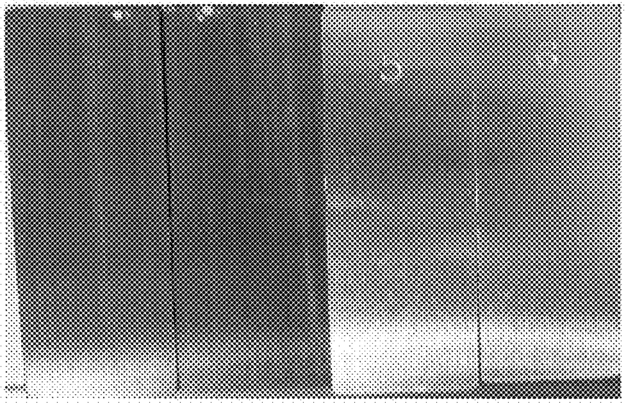
Figure 19:
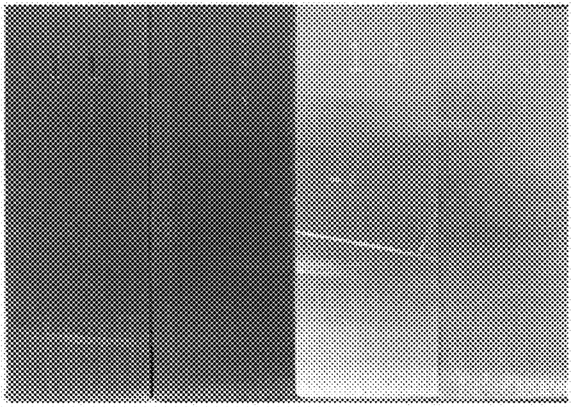
Figure 20:
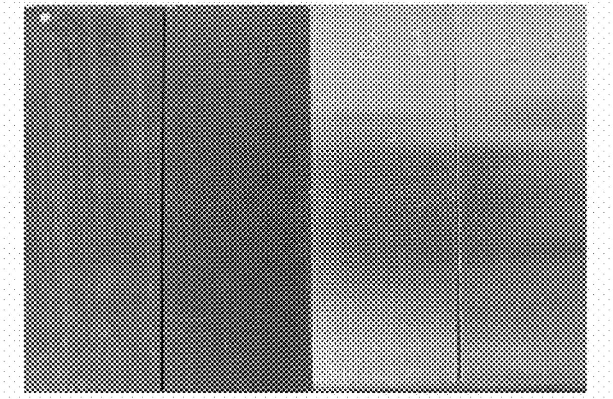
Figure 21:
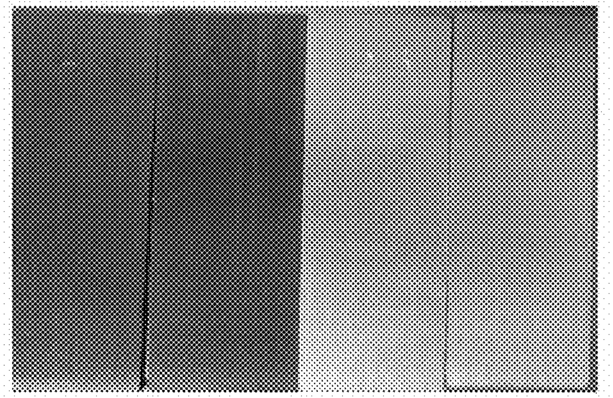
Figure 22:
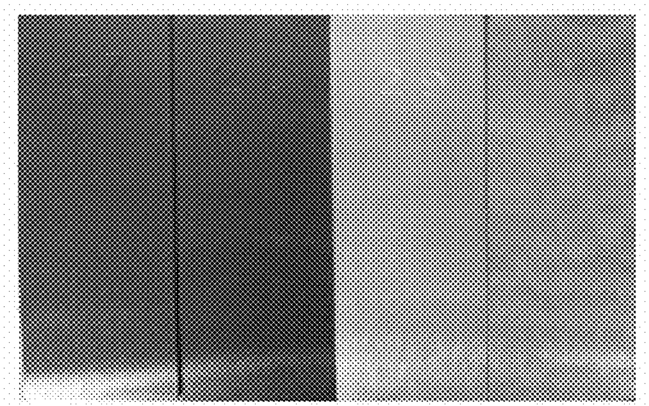
Figure 23:
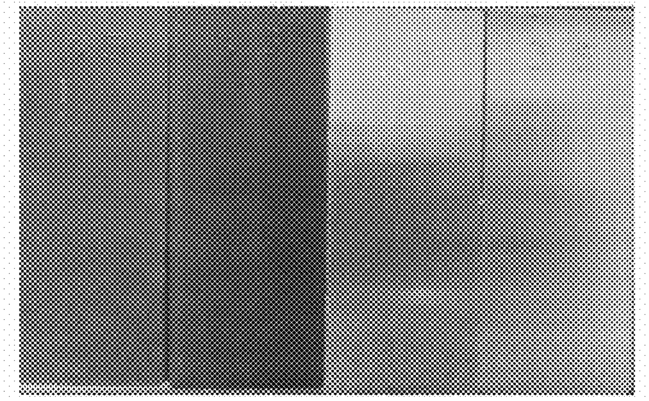
Figure 24:
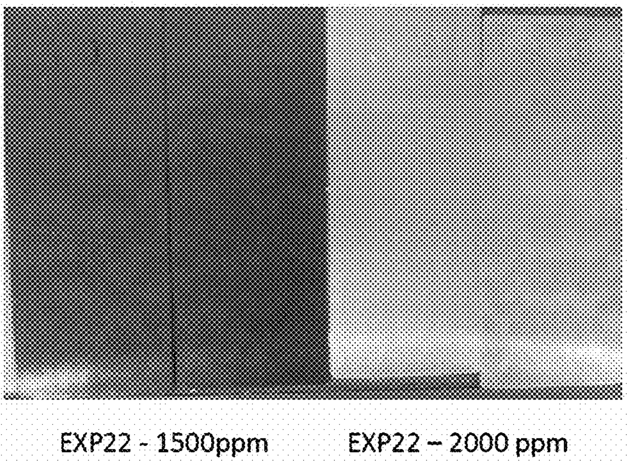
Figure 25:
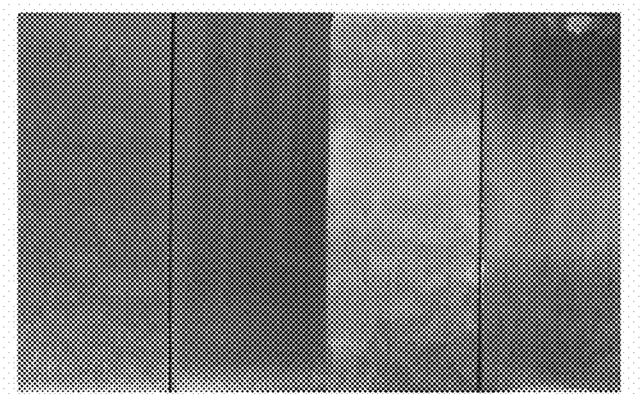
Figure 26:
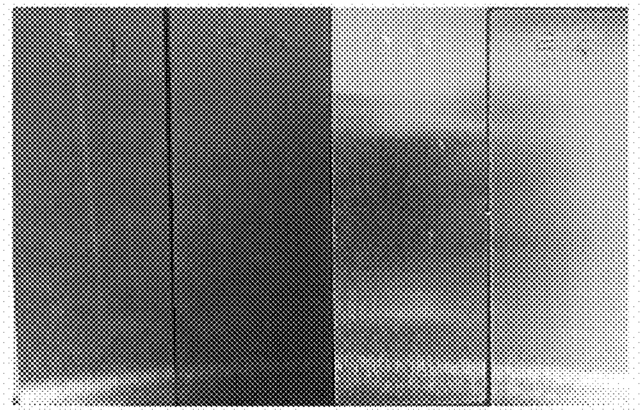
Figure 27:
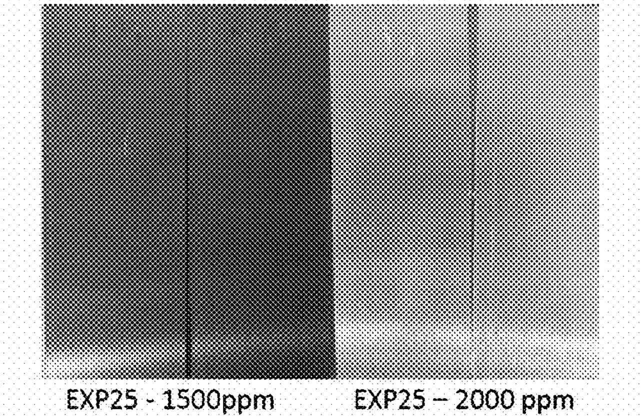

FIG. 1 shows that Control 1 composition causes discoloration, due to the fact that Control 1 composition contains NTA as chelant, instead an aminocarboxylate or EDTA. FIG. 2 shows that Control 2 composition does not cause any discoloration. However, FIG. 2 indicates that the metal surface cleaned by Control 2 composition is not as shiny as other surfaced cleaned by some of the claimed detergent compositions. Control 2 composition contains MGDA, but not EDTA. The exemplary compositions used for FIG. 3-FIG. 27 include both MGDA and EDTA.

Comparing FIG. 1-FIG. 2 with FIG. 3-FIG. 27, one can conclude that majority of the claimed detergent compositions in a lower concentration can yield a shiny and metallic surface without/with any discoloration after cleaning and deliver an improved performance over Control 1 and Control 2. EXP1-EXP3 yield a shiny and metallic cleaned surface, likely due to the fact that in these exemplary compositions, the ratio of $SiO_2$ (Sodium Silicate) to EDTA is about 2.10 and the ratio of EDTA to MGDA is greater than about 1:1. In a higher concentration, the majority of the claimed detergent compositions yield a both shiny and metallic surface without any discoloration, clearly improved performance over Control 1 and Control 2 composition. EXP13 and EXP23 fail to yield a surface without discoloration, due to the fact that the ratio of EDTA to MGDA in these two exemplary compositions is less than 1:3.5. The exemplary EXP1-EXP25 compositions comprise an alkalinity source; an alkali metal silicate; an aminocarboxylate comprising ethylenediamine-N,N-diacetic acid (EDTA) and MGDA; at least two water conditioning polymers; and a defoaming agent. Whereas Control 1 and Control 2 does not contain an aminocarboxylate or EDTA, respectively.

TABLE 6

| | Detergent Concentration | |
|---|---|---|
| Formulation | 1500 ppm | 2000 ppm |
| Control 1 | Fail | Fail |
| Control 2 | Pass | Pass |
| EXP1 | Pass | Pass |
| EXP2 | Pass | Pass |
| EXP3 | Pass | Pass |
| EXP4 | Fail | Pass |
| EXP5 | Fail | Pass |
| EXP6 | Fail | Pass |
| EXP7 | Fail | Pass |
| EXP8 | Fail | Pass |
| EXP9 | Fail | Pass |
| EXP10 | Fail | Pass |
| EXP11 | Fail | Pass |
| EXP12 | Fail | Pass |
| EXP13 | Fail | Fail |
| EXP14 | Fail | Pass |
| EXP15 | Fail | Pass |
| EXP16 | Fail | Pass |
| EXP17 | Fail | Pass |
| EXP18 | Fail | Pass |
| EXP19 | Fail | Pass |
| EXP20 | Fail | Pass |
| EXP21 | Fail | Pass |
| EXP22 | Fail | Pass |
| EXP23 | Fail | Fail |
| EXP24 | Fail | Pass |
| EXP25 | Fail | Pass |

The detergent compositions disclosed herein being thus described, it will be obvious that the same may be varied in many ways. Such variations are not to be regarded as a departure from the spirit and scope of the detergent compositions disclosed herein and all such modifications are intended to be included within the scope of the following claims.

The above specification provides a description of the manufacture and methods of use of the disclosed compositions. Since many embodiments can be made without departing from the spirit and scope of the detergent compositions disclosed herein, the invention resides in the claims.

What is claimed is:

1. A method of warewashing comprising:

obtaining a solid, alkaline, non-staining detergent composition comprising:

from about 60 wt-% to about 70 wt-% of a sodium carbonate alkalinity source;

from 12 wt-% to about 15 wt-% (by actives) of an alkali metal silicate;

from 5 wt-% to about 10 wt-% (by actives) of an ethylenediaminetetraacetic acid (EDTA) or salts thereof;

from about 1 wt-% to about 10 wt-% (by actives) of a methylglycine-N,N-diacetic acid (MGDA) or salts thereof;

from 2.5 wt-% to about 5 wt-% (by actives) of at least one water conditioning polymer comprising polymaleic acid homopolymer, a polyacrylic acid homopolymer, or combinations thereof; and from about 1 wt-% to about 5 wt-% of an alcohol alkoxylate nonionic surfactant defoaming agent;

wherein a weight ratio by actives of ethylenediaminetetraacetic acid or salt thereof to methylglycine-N,N-diacetic acid (MGDA) or salt thereof is at least about 1:1;

wherein the composition is substantially free of nitrilotriacetic acid (NTA) diluting the detergent composition to provide a use solution with a concentration of at least about 1500 ppm detergent;

contacting a ware with the use solution; and removing soils from the ware without causing discoloration thereof.

2. The method of claim 1, wherein the alkali metal silicate is sodium silicate.

3. The method of claim 1, wherein the polymaleic acid homopolymer has a molecular weight less than about 2,000 g/mol, and wherein the polyacrylic acid homopolymer has a molecular weight between about 500 to about 50,000 g/mol.

4. The method of claim 1, wherein a weight ratio by actives of the alkali metal silicate to the ethylenediaminetetraacetic acid (EDTA) or salt thereof, is from about 1:1 to about 3:1.

5. The method of claim 1, wherein a weight ratio by actives of the alkali metal silicate to the ethylenediaminetetraacetic acid (EDTA) or salt thereof, is from about 1:1 to about 2:1.

6. The method of claim 1, wherein a weight ratio by actives of the alkali metal silicate to the ethylenediaminetetraacetic acid (EDTA) or salt thereof, is from about 1:1 to about 1.6:1.

7. The method of claim 1, wherein a weight ratio by actives of the alkali metal silicate to the water conditioning polymer is from about 1:1 to about 5:1.

8. The method of claim 1, wherein the detergent composition further comprises an additional functional ingredient.

9. The method of claim 1, wherein the detergent composition has a concentration of at least about 2000 ppm in the use solution.

10. The method of claim 1, wherein the detergent composition has a concentration of about 1500 ppm to about 4000 in the use solution.

11. The method of claim 1, wherein the ware comprises an aluminum surface.

12. The method of claim 11, wherein the aluminum surface comprises 1050, 1060, 1100, 1199, 2014, 2219, 3003, 3004, 3102, 4041, 5005, 5052, 5083, 5086, 5154, 5356, 5454, 5456, 5754, 6005, 6005A, 6060, 6061, 6063, 6066, 6070, 6082, 6105, 6162, 6262, 6351, 6463, 7005, 7022, 7068, 7072, 7075, 7079, 7116, 7129, 7178 aluminum-based alloy, or any combination thereof.

13. The method of claim 1, wherein the contacting is for about 45 seconds to about 24 hours.

14. The method of claim 1, wherein the contacting is for about 45 seconds to about 1 hour.

15. The method of claim 1, wherein the contacting is in a warewashing machine.

16. The method of claim 15, wherein the contacting is for about 2 seconds to about 20 minutes.

17. The method of claim 15, further employing agitation for further removal of soils.

* * * * *